United States Patent
Park et al.

(10) Patent No.: US 12,035,390 B2
(45) Date of Patent: Jul. 9, 2024

(54) METHOD AND APPARATUS FOR PERFORMING SL DRX OPERATION BASED ON A DEFAULT DRX CONFIGURATION IN NR V2X

(71) Applicant: LG Electronics Inc., Seoul (KR)

(72) Inventors: Giwon Park, Seoul (KR); Seungmin Lee, Seoul (KR); Seoyoung Back, Seoul (KR); Jongwoo Hong, Seoul (KR)

(73) Assignee: LG Electronics Inc., Seoul (KR)

(*) Notice: Subject to any disclaimer, the term of this patent is extended or adjusted under 35 U.S.C. 154(b) by 360 days.

(21) Appl. No.: 17/562,427

(22) Filed: Dec. 27, 2021

(65) Prior Publication Data

US 2022/0256625 A1    Aug. 11, 2022

Related U.S. Application Data

(60) Provisional application No. 63/130,429, filed on Dec. 24, 2020, provisional application No. 63/130,430, filed on Dec. 24, 2020.

(30) Foreign Application Priority Data

Jan. 4, 2021  (KR) .................. 10-2021-0000239
Jan. 26, 2021 (KR) .................. 10-2021-0010759

(51) Int. Cl.
*H04W 76/14*  (2018.01)
*H04W 76/28*  (2018.01)
*H04W 92/18*  (2009.01)

(52) U.S. Cl.
CPC ........... *H04W 76/14* (2018.02); *H04W 76/28* (2018.02); *H04W 92/18* (2013.01)

(58) Field of Classification Search
CPC ..... H04W 76/14; H04W 76/28; H04W 92/18; H04W 4/40; H04W 52/02; H04W 72/04;
(Continued)

(56) References Cited

U.S. PATENT DOCUMENTS

2015/0215989 A1   7/2015   Bangolae et al.
2022/0312326 A1*  9/2022   Wu .................... H04W 76/28
(Continued)

OTHER PUBLICATIONS

3GPP TR 23.776 V1.0.0 (Nov. 2020), "3rd Generation Partnership Project; Technical Specification Group Services and System Aspects; Study on architecture enhancements for 3GPP support of advanced Vehicle-to-Everything (V2X) services; Phase 2 (Release 17)," Nov. 2020, 29 pages.
(Continued)

*Primary Examiner* — Jae Y Lee
(74) *Attorney, Agent, or Firm* — Fish & Richardson P.C.

(57) ABSTRACT

In an embodiment, a method for performing wireless communication by a first device is provided. The method may include: obtaining a default discontinuous reception (DRX) configuration for a groupcast or a broadcast, the default DRX configuration including information related to a sidelink (SL) DRX cycle and information related to an active time; and receiving, from a second device, a message for establishing a unicast connection with the second device, wherein the message for establishing the unicast connection with the second device is received based on the default DRX configuration.

20 Claims, 17 Drawing Sheets

(58) Field of Classification Search
CPC ... H04W 76/40; H04W 52/0216; H04W 4/06;
H04W 52/0219; H04W 52/0225; H04W
52/0248; H04W 72/0446; H04W 72/25;
Y02D 30/70
See application file for complete search history.

(56) References Cited

U.S. PATENT DOCUMENTS

| | | | |
|---|---|---|---|
| 2023/0014303 A1* | 1/2023 | Di Girolamo | H04W 72/20 |
| 2023/0156858 A1* | 5/2023 | Freda | H04W 52/0229 |
| | | | 370/329 |

OTHER PUBLICATIONS

Apple, "Discussion on Sidelink DRX," 3GPP TSG-RAN WG2 Meeting #112e, R2-2009527, Online, Nov. 2-13, 2020, 5 pages.
Ericsson, "DRX for sidelink communications," 3GPP TSG-RAN WG2 Meeting #112-e, R2-2009231, e-Meeting, Nov. 2-13, 2020, 6 pages.
LG Electronics Inc., "Discussion on Sidelink DRX," 3GPP TSG-RAN WG2 Meeting #112 electronic, R2-2008943, Online, Nov. 2-13, 2020, 6 pages.
PCT International Search Report in International Application No. PCT/KR2021/019665, dated Mar. 17, 2022, 8 pages (with English translation).

* cited by examiner

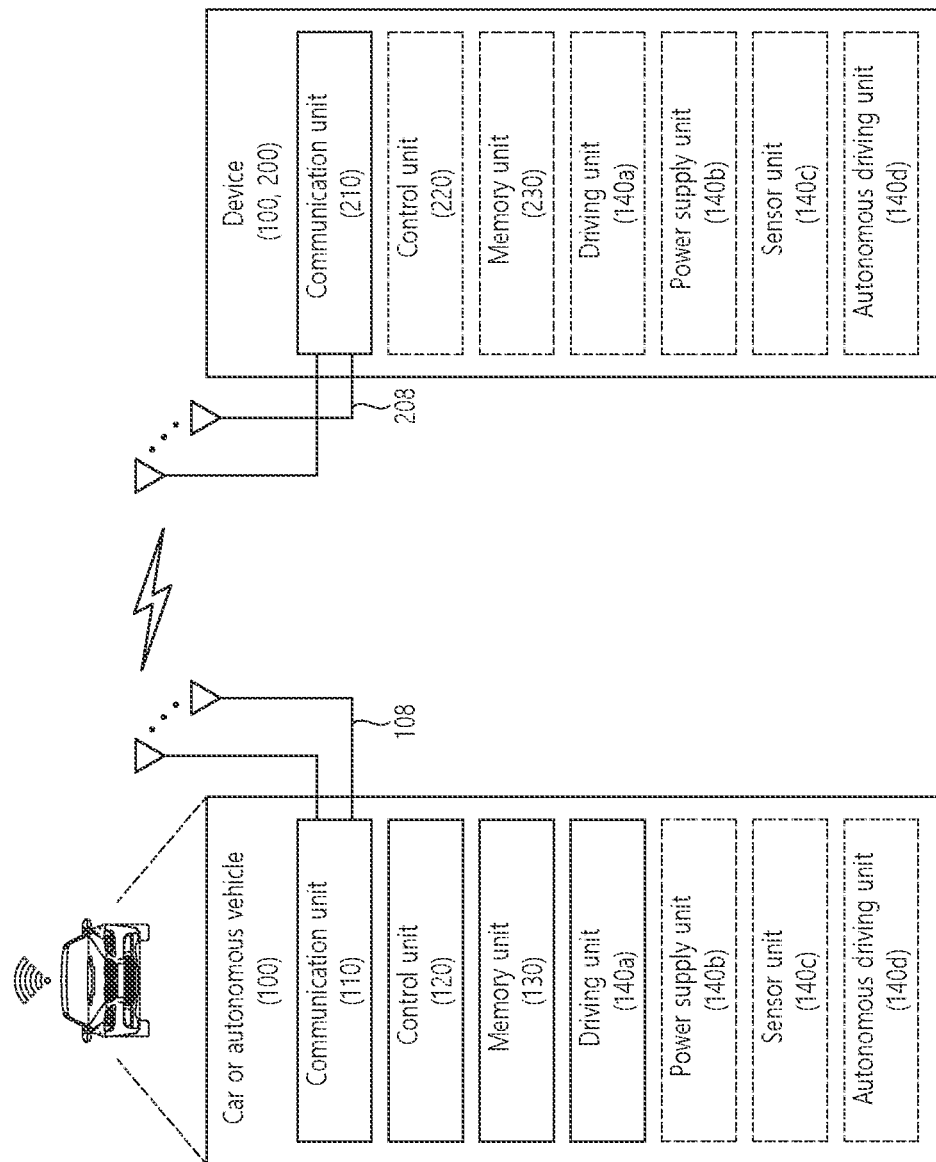

METHOD AND APPARATUS FOR PERFORMING SL DRX OPERATION BASED ON A DEFAULT DRX CONFIGURATION IN NR V2X

CROSS-REFERENCE TO RELATED APPLICATIONS

Pursuant to 35 U.S.C. § 119, this application claims the benefit of U.S. Provisional Applications No. 63/130,429, filed on Dec. 24, 2020 and No. 63/130,430, filed on Dec. 24, 2020 and Korean Patent Applications No. 10-2021-0000239, filed on Jan. 4, 2021, and No. 10-2021-0010759, filed on Jan. 26, 2021, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of a base station (BS). SL communication is under consideration as a solution to resolve the overhead of the BS caused by rapidly increasing data traffic. Vehicle-to-everything (V2X) refers to a communication technology through which a vehicle exchanges information with another vehicle, a pedestrian, an object having an infrastructure (or infra) established therein, and so on. The V2X may be classified into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices requires larger communication capacities, the need for mobile broadband communication that is more enhanced than the existing Radio Access Technology (RAT) is rising. Accordingly, discussions are made on services and UE that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new RAT or new radio (NR). Herein, the NR may also support V2X communication.

SUMMARY OF THE DISCLOSURE

Technical Objects

Meanwhile, in sidelink communication, a UE may perform a sidelink discontinuous reception (SL DRX) operation to save a power of the UE. For example, before establishing a unicast connection, there may be a problem which DRX configuration is used by the UE to receive a broadcast message to establish the unicast connection.

Technical Solutions

In an embodiment of the disclosure, a method for performing wireless communication by a first device is provided. The method may include obtaining a default discontinuous reception (DRX) configuration for a groupcast or a broadcast, the default DRX configuration including information related to a sidelink (SL) DRX cycle and information related to an active time, and receiving, from a second device, a message for establishing a unicast connection with the second device. For example, the message for establishing the unicast connection with the second device may be received based on the default DRX configuration.

In an embodiment of the disclosure, a first device configured to perform wireless communication is provided. For example, the first device may include one or more memories storing instructions, one or more transceivers, and one or more processors connected to the one or more memories and the one or more transceivers. For example, the one or more processors may execute the instructions to obtain a default discontinuous reception (DRX) configuration for a groupcast or a broadcast, the default DRX configuration including information related to a sidelink (SL) DRX cycle and information related to an active time, and receive, from a second device, a message for establishing a unicast connection with the second device. For example, the message for establishing the unicast connection with the second device may be received based on the default DRX configuration.

In an embodiment of the disclosure, an apparatus configured to control a first user equipment (UE) is provided. For example, the apparatus may include one or more processors, and one or more memories operably connected to the one or more processors and storing instructions. For example, the one or more processors may execute the instructions to obtain a default discontinuous reception (DRX) configuration for a groupcast or a broadcast, the default DRX configuration including information related to a sidelink (SL) DRX cycle and information related to an active time, and receive, from a second device, a message for establishing a unicast connection with the second device. For example, the message for establishing the unicast connection with the second device may be received based on the default DRX configuration.

In an embodiment of the disclosure, a non-transitory computer-readable medium having instructions stored thereon is provided. The instructions, when executed, cause a first device to obtain a default discontinuous reception (DRX) configuration for a groupcast or a broadcast, the default DRX configuration including information related to a sidelink (SL) DRX cycle and information related to an active time, and receive, from a second device, a message for establishing a unicast connection with the second device. For example, the message for establishing the unicast connection with the second device may be received based on the default DRX configuration.

In an embodiment of the disclosure, a method for performing wireless communication by a second device is provided. The method may include transmitting, to a first device, a message for establishing a unicast connection with the first device. For example, the message for establishing a unicast connection with the first device may be transmitted based on a default discontinuous reception (DRX) configuration for a groupcast or a broadcast. For example, the default DRX configuration is obtained and default DRX configuration may include information related to a sidelink (SL) DRX cycle and information related to an active time.

In an embodiment of the disclosure, a second device configured to perform wireless communication is provided. For example, the second device may include one or more memories storing instructions, one or more transceivers, and one or more processors connected to the one or more memories and the one or more transceivers. For example, the one or more processors may execute the instructions to transmit, to a first device, a message for establishing a unicast connection with the first device. For example, the message for establishing a unicast connection with the first device may be transmitted based on a default discontinuous reception (DRX) configuration for a groupcast or a broadcast. For example, the default DRX configuration is obtained and default DRX configuration may include information related to a sidelink (SL) DRX cycle and information related to an active time.

EFFECTS OF THE DISCLOSURE

Even before a unicast connection is established, a UE can receive a broadcast message based on the default DRX configuration, thereby smoothly maintaining sidelink communication and saving power.

BRIEF DESCRIPTION OF THE DRAWINGS

FIG. 17 shows a vehicle or an autonomous vehicle, based on an embodiment of the present disclosure.

DESCRIPTION OF EXEMPLARY EMBODIMENTS

Figure 1:
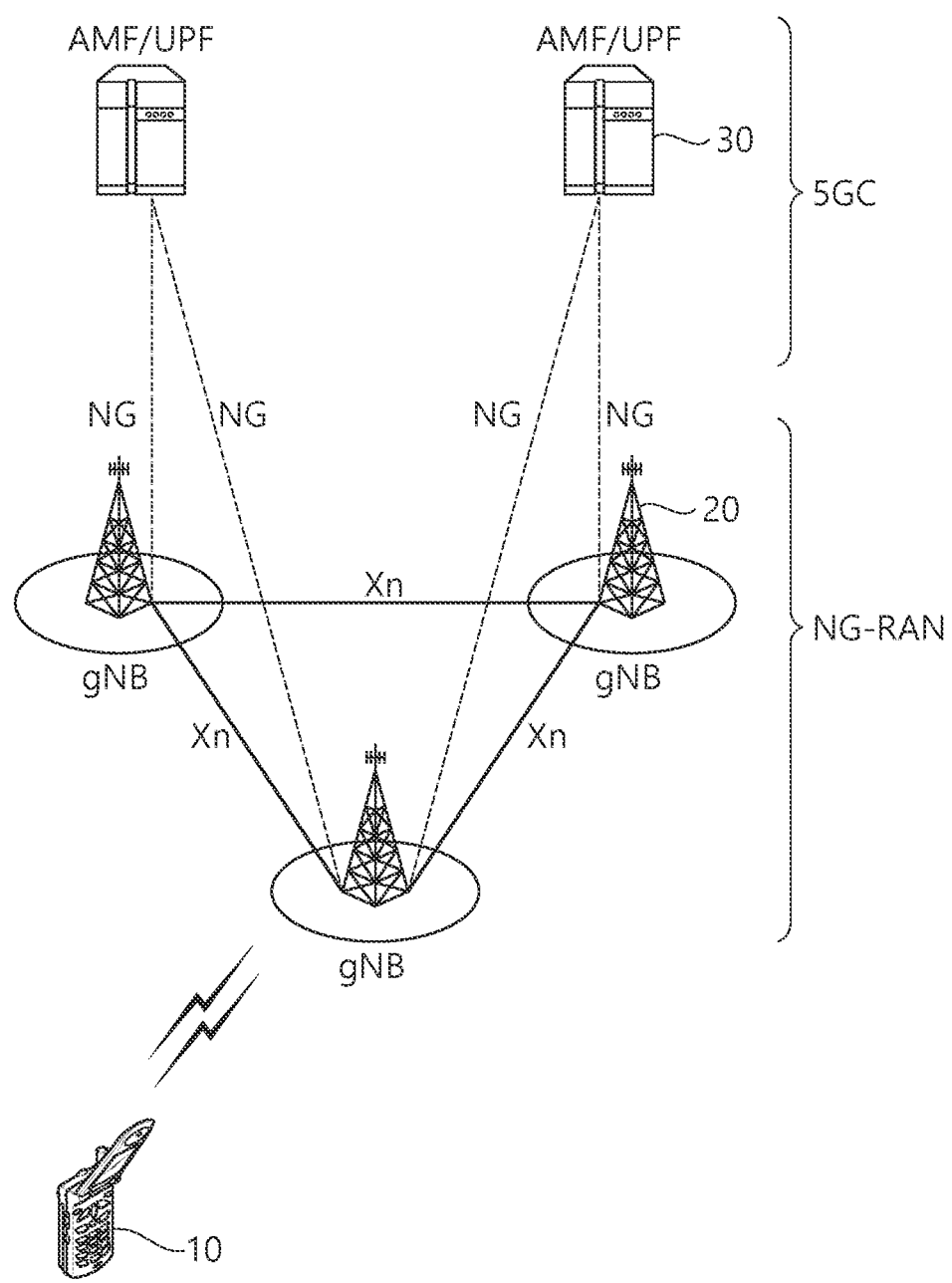
FIG. 1 shows a structure of an NR system, based on an embodiment of the present disclosure.

In the present disclosure, "A or B" may mean "only A", "only B" or "both A and B." In other words, in the present disclosure, "A or B" may be interpreted as "A and/or B". For example, in the present disclosure, "A, B, or C" may mean "only A", "only B", "only C", or "any combination of A, B, C".

A slash (/) or comma used in the present disclosure may mean "and/or". For example, "A/B" may mean "A and/or B". Accordingly, "A/B" may mean "only A", "only B", or "both A and B". For example, "A, B, C" may mean "A, B, or C".

In the present disclosure, "at least one of A and B" may mean "only A", "only B", or "both A and B". In addition, in the present disclosure, the expression "at least one of A or B" or "at least one of A and/or B" may be interpreted as "at least one of A and B".

In addition, in the present disclosure, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present disclosure may mean "for example". Specifically, when indicated as "control information (PDCCH)", it may mean that "PDCCH" is proposed as an example of the "control information". In other words, the "control information" of the present disclosure is not limited to "PDCCH", and "PDCCH" may be proposed as an example of the "control information". In addition, when indicated as "control information (i.e., PDCCH)", it may also mean that "PDCCH" is proposed as an example of the "control information".

In the following description, 'when, if, or in case of' may be replaced with 'based on'.

A technical feature described individually in one figure in the present disclosure may be individually implemented, or may be simultaneously implemented.

In the present disclosure, a higher layer parameter may be a parameter which is configured, pre-configured or pre-defined for a UE. For example, a base station or a network may transmit the higher layer parameter to the UE. For example, the higher layer parameter may be transmitted through radio resource control (RRC) signaling or medium access control (MAC) signaling.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

For terms and techniques not specifically described among terms and techniques used in the present disclosure, reference may be made to a wireless communication standard document published before the present disclosure is filed.

FIG. 1 shows a structure of an NR system, based on an embodiment of the present disclosure. The embodiment of FIG. 1 may be combined with various embodiments of the present disclosure.

Referring to FIG. 1, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 1 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Layers of a radio interface protocol between the UE and the network can be classified into a first layer (layer 1, L1), a second layer (layer 2, L2), and a third layer (layer 3, L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
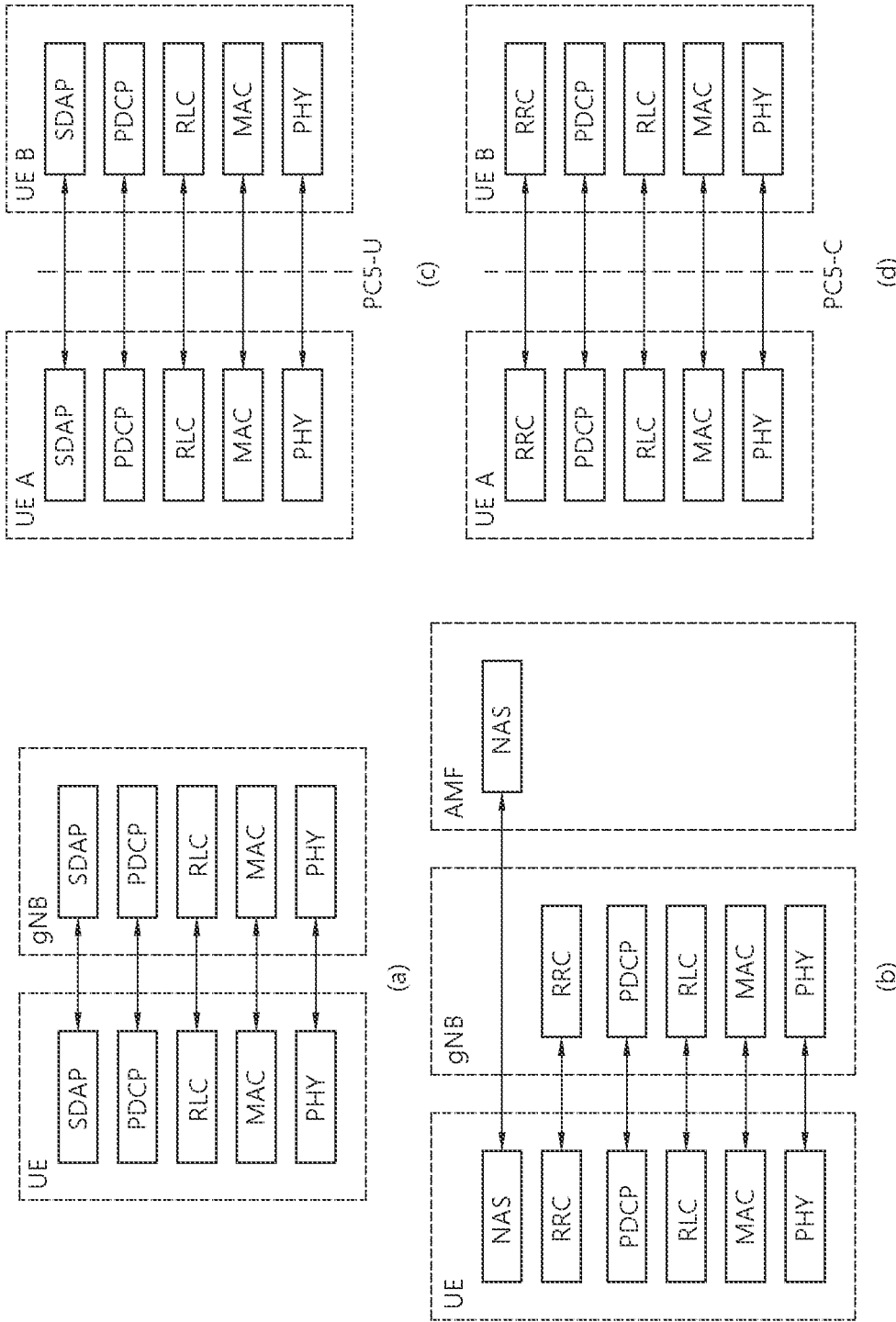
FIG. 2 shows a radio protocol architecture, based on an embodiment of the present disclosure.

FIG. 2 shows a radio protocol architecture, based on an embodiment of the present disclosure. The embodiment of FIG. 2 may be combined with various embodiments of the present disclosure. Specifically, (a) of FIG. 2 shows a radio protocol stack of a user plane for Uu communication, and (b) of FIG. 2 shows a radio protocol stack of a control plane for Uu communication. (c) of FIG. 2 shows a radio protocol stack of a user plane for SL communication, and (d) of FIG. 2 shows a radio protocol stack of a control plane for SL communication.

Referring to FIG. 2, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., a MAC layer, an RLC layer, a packet data convergence protocol (PDCP) layer, and a service data adaptation protocol (SDAP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 3:
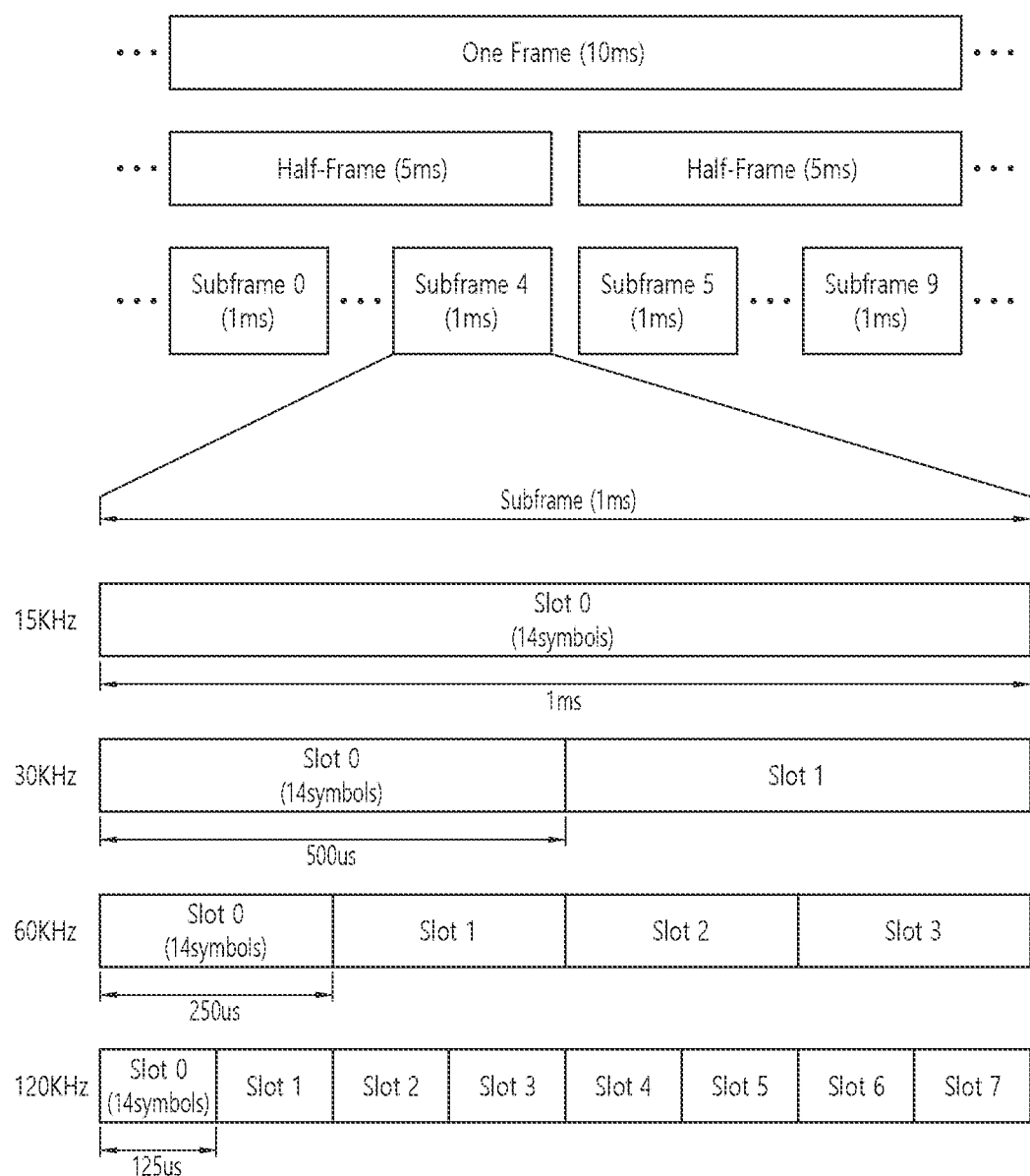
FIG. 3 shows a structure of a radio frame of an NR, based on an embodiment of the present disclosure.

FIG. 3 shows a structure of a radio frame of an NR, based on an embodiment of the present disclosure. The embodiment of FIG. 3 may be combined with various embodiments of the present disclosure.

Referring to FIG. 3, in the NR, a radio frame may be used for performing uplink and downlink transmission. A radio frame has a length of 10 ms and may be defined to be configured of two half-frames (HFs). A half-frame may include five lms subframes (SFs). A subframe (SF) may be divided into one or more slots, and the number of slots within a subframe may be determined based on subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) based on an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe based on the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 4:
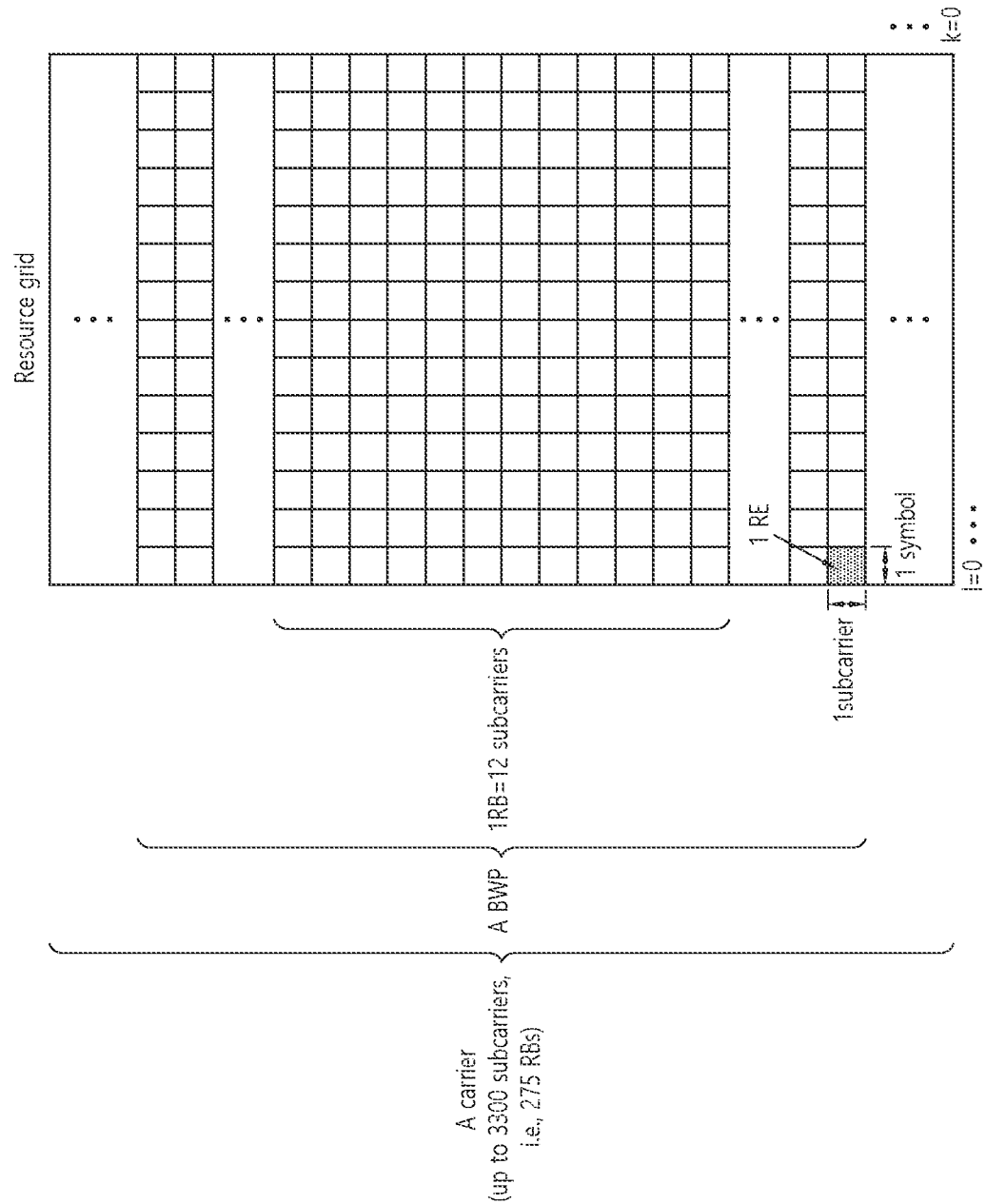
FIG. 4 shows a structure of a slot of an NR frame, based on an embodiment of the present disclosure.

FIG. 4 shows a structure of a slot of an NR frame, based on an embodiment of the present disclosure. The embodiment of FIG. 4 may be combined with various embodiments of the present disclosure.

Referring to FIG. 4, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, physical downlink shared channel (PDSCH), or channel state information-reference signal (CSI-RS) (excluding RRM) outside the active DL BWP. For example, the UE may not trigger a channel state information (CSI) report for the inactive DL BWP. For example, the UE may not transmit physical uplink control channel (PUCCH) or physical uplink shared channel (PUSCH) outside an active UL BWP. For example, in a downlink case, the initial BWP may be given as a consecutive RB set for a remaining minimum system information (RMSI) control resource set (CORESET) (configured by physical broadcast channel (PBCH)). For example, in an uplink case, the initial BWP may be given by system information block (SIB) for a random access procedure. For example, the default BWP may be configured by a higher layer. For example, an initial value of the default BWP may be an initial DL BWP. For energy saving, if the UE fails to detect downlink control information (DCI) during a specific period, the UE may switch the active BWP of the UE to the default BWP.

Meanwhile, the BWP may be defined for SL. The same SL BWP may be used in transmission and reception. For example, a transmitting UE may transmit a SL channel or a SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. For example, the UE may receive a configuration for the Uu BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 5:
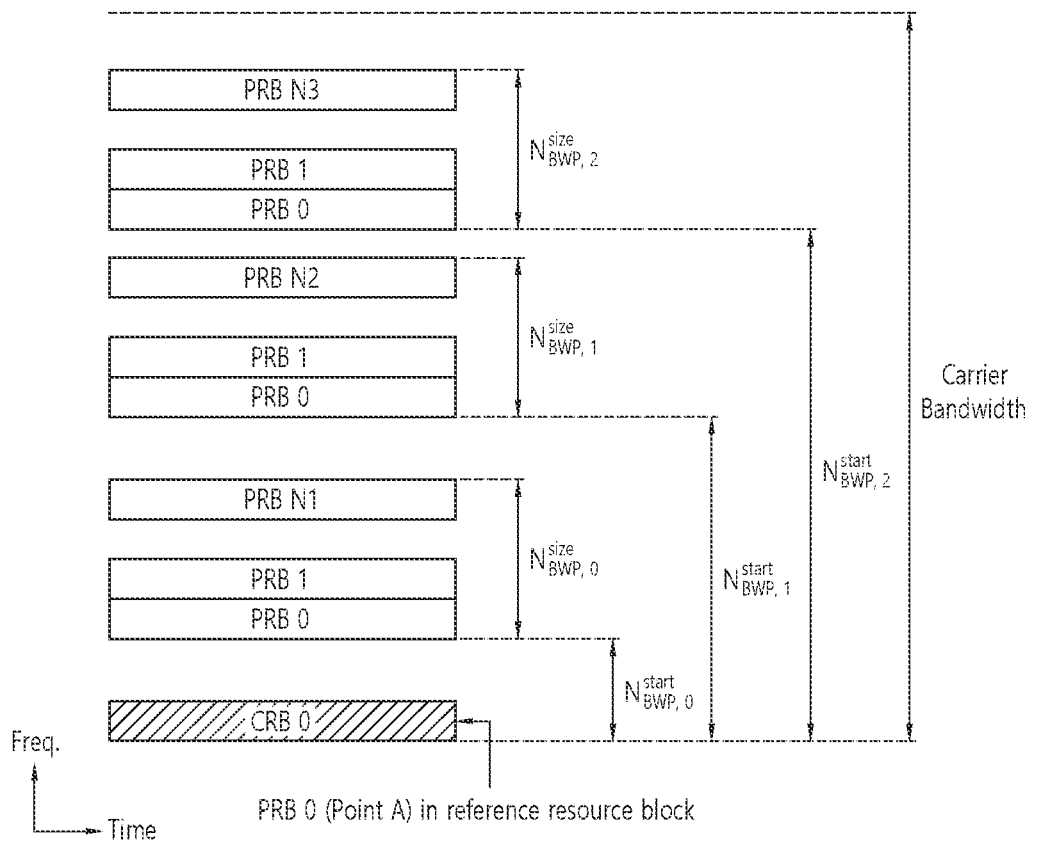
FIG. 5 shows an example of a BWP, based on an embodiment of the present disclosure.

FIG. 5 shows an example of a BWP, based on an embodiment of the present disclosure. The embodiment of FIG. 5 may be combined with various embodiments of the present disclosure. It is assumed in the embodiment of FIG. 5 that the number of BWPs is 3.

Referring to FIG. 5, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

A sidelink synchronization signal (SLSS) may include a primary sidelink synchronization signal (PSSS) and a secondary sidelink synchronization signal (SSSS), as a SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit cyclic redundancy check (CRC).

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 6:
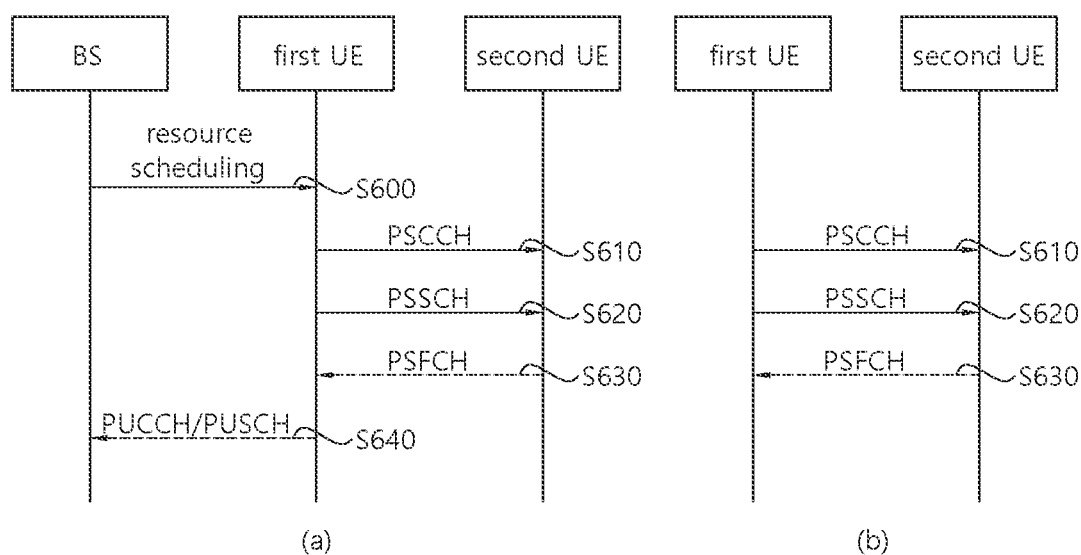
FIG. 6 shows a procedure of performing V2X or SL communication by a UE based on a transmission mode, based on an embodiment of the present disclosure.

FIG. 6 shows a procedure of performing V2X or SL communication by a UE based on a transmission mode, based on an embodiment of the present disclosure. The embodiment of FIG. 6 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, (a) of FIG. 6 shows a UE operation related to an LTE transmission mode 1 or an LTE transmission mode 3. Alternatively, for example, (a) of FIG. 6 shows a UE operation related to an NR resource allocation mode 1. For example, the LTE transmission mode 1 may be applied to general SL communication, and the LTE transmission mode 3 may be applied to V2X communication.

For example, (b) of FIG. 6 shows a UE operation related to an LTE transmission mode 2 or an LTE transmission mode 4. Alternatively, for example, (b) of FIG. 6 shows a UE operation related to an NR resource allocation mode 2.

Referring to (a) of FIG. 6, in the LTE transmission mode 1, the LTE transmission mode 3, or the NR resource allocation mode 1, a base station may schedule SL resource(s) to be used by a UE for SL transmission. For example, in step S600, a base station may transmit information related to SL resource(s) and/or information related to UL resource(s) to a first UE. For example, the UL resource(s) may include PUCCH resource(s) and/or PUSCH resource(s). For example, the UL resource(s) may be resource(s) for reporting SL HARQ feedback to the base station.

For example, the first UE may receive information related to dynamic grant (DG) resource(s) and/or information related to configured grant (CG) resource(s) from the base station. For example, the CG resource(s) may include CG type 1 resource(s) or CG type 2 resource(s). In the present disclosure, the DG resource(s) may be resource(s) configured/allocated by the base station to the first UE through a downlink control information (DCI). In the present disclosure, the CG resource(s) may be (periodic) resource(s) configured/allocated by the base station to the first UE through a DCI and/or an RRC message. For example, in the case of the CG type 1 resource(s), the base station may transmit an RRC message including information related to CG resource(s) to the first UE. For example, in the case of the CG type 2 resource(s), the base station may transmit an RRC message including information related to CG resource(s) to the first UE, and the base station may transmit a DCI related to activation or release of the CG resource(s) to the first UE.

In step S610, the first UE may transmit a PSCCH (e.g., sidelink control information (SCI) or $1^{st}$-stage SCI) to a second UE based on the resource scheduling. In step S620, the first UE may transmit a PSSCH (e.g., $2^{nd}$-stage SCI, MAC PDU, data, etc.) related to the PSCCH to the second UE. In step S630, the first UE may receive a PSFCH related to the PSCCH/PSSCH from the second UE. For example, HARQ feedback information (e.g., NACK information or ACK information) may be received from the second UE through the PSFCH. In step S640, the first UE may transmit/report HARQ feedback information to the base station through the PUCCH or the PUSCH. For example, the HARQ feedback information reported to the base station may be information generated by the first UE based on the HARQ feedback information received from the second UE. For example, the HARQ feedback information reported to the base station may be information generated by the first UE based on a pre-configured rule. For example, the DCI may be a DCI for SL scheduling. For example, a format of the DCI may be a DCI format 3_0 or a DCI format 3_1.

Hereinafter, an example of DCI format 3_0 will be described.

DCI format 3_0 is used for scheduling of NR PSCCH and NR PSSCH in one cell.

The following information is transmitted by means of the DCI format 3_0 with CRC scrambled by SL-RNTI or SL-CS-RNTI:

Resource pool index—ceiling ($\log_2$ I) bits, where I is the number of resource pools for transmission configured by the higher layer parameter sl-TxPoolScheduling.
Time gap—3 bits determined by higher layer parameter sl-DCI-ToSL-Trans
HARQ process number—4 bits
New data indicator—1 bit —Lowest index of the subchannel allocation to the initial transmission—ceiling ($\log_2(N^{SL}_{subChannel})$) bits
SCI format 1-A fields: frequency resource assignment, time resource assignment
PSFCH-to-HARQ feedback timing indicator—ceiling ($\log_2 N_{fb\_timing}$) bits, where $N_{fb\_timing}$ is the number of entries in the higher layer parameter sl-PSFCH-To-PUCCH.
PUCCH resource indicator—3 bits
Configuration index—0 bit if the UE is not configured to monitor DCI format 3_0 with CRC scrambled by SL-CS-RNTI; otherwise 3 bits. If the UE is configured to monitor DCI format 3_0 with CRC scrambled by SL-CS-RNTI, this field is reserved for DCI format 3_0 with CRC scrambled by SL-RNTI.
Counter sidelink assignment index—2 bits, 2 bits if the UE is configured with pdsch-HARQ-ACK-Codebook=dynamic, 2 bits if the UE is configured with pdsch-HARQ-ACK-Codebook=semi-static
Padding bits, if required Referring to (b) of FIG. 6, in the LTE transmission mode 2, the LTE transmission mode 4, or the NR resource allocation mode 2, a UE may determine SL transmission resource(s) within SL resource(s) configured by a base station/network or pre-configured SL resource(s). For example, the configured SL resource(s) or the pre-configured SL resource(s) may be a resource pool. For example, the UE may autonomously select or schedule resource(s) for SL transmission. For example, the UE may perform SL communication by autonomously selecting resource(s) within the configured resource pool. For example, the UE may autonomously select resource(s) within a selection window by performing a sensing procedure and a resource (re)selection procedure. For example, the sensing may be performed in a unit of subchannel(s). For example, in step S610, a first UE which has selected resource(s) from a resource pool by itself may transmit a PSCCH (e.g., sidelink control information (SCI) or 1st-stage SCI) to a second UE by using the resource(s). In step S620, the first UE may transmit a PSSCH (e.g., 2nd-stage SCI, MAC PDU, data, etc.) related to the PSCCH to the second UE. In step S630, the first UE may receive a PSFCH related to the PSCCH/PSSCH from the second UE. Referring to (a) or (b) of FIG. 6, for example, the first UE may transmit a SCI to the second UE through the PSCCH. Alternatively, for example, the first UE may transmit two consecutive SCIs (e.g., 2-stage SCI) to the second UE through the PSCCH and/or the PSSCH. In this case, the second UE may decode two consecutive SCIs (e.g., 2-stage SCI) to receive the PSSCH from the first UE. In the present disclosure, a SCI transmitted through a PSCCH may be referred to as a $1^{st}$ SCI, a first SCI, a $1^{st\text{-}stage}$ SCI or a $1^{st}$-stage SCI format, and a SCI transmitted through a PSSCH may be referred to as a $2^{nd}$ SCI, a second SCI, a $2^{nd}$-stage SCI or a $2^{nd}$-stage SCI format. For example, the $1^{st}$-stage SCI format may include a SCI format 1-A, and the $2^{nd}$-stage SCI format may include a SCI format 2-A and/or a SCI format 2-B.

Hereinafter, an example of SCI format 1-A will be described.

SCI format 1-A is used for the scheduling of PSSCH and 2nd-stage-SCI on PSSCH.

The following information is transmitted by means of the SCI format 1-A:

Priority—3 bits
Frequency resource assignment—ceiling ($\log_2 (N^{SL}_{subChannel}(N^{SL}_{subChannel+1})/2)$) bits when the value of the higher layer parameter sl-MaxNumPerReserve is configured to 2; otherwise ceiling $\log_2(N^{SL}_{subChannel}(N^{SL}_{subChannel+1})(2N^{SL}_{subChannel+1})/6)$ bits when the value of the higher layer parameter sl-MaxNumPerReserve is configured to 3
Time resource assignment—5 bits when the value of the higher layer parameter sl-MaxNumPerReserve is configured to 2; otherwise 9 bits when the value of the higher layer parameter sl-MaxNumPerReserve is configured to 3

Resource reservation period—ceiling (log$_2$ N$_{rsv\_period}$) bits, where N$_{rsv\_period}$ is the number of entries in the higher layer parameter sl-ResourceReservePeriodList, if higher layer parameter sl-MultiReserveResource is configured; 0 bit otherwise DMRS pattern—ceiling (log$_2$ N$_{pattern}$) bits, where N$_{pattern}$ is the number of DMRS patterns configured by higher layer parameter sl-PSSCH-DMRS-TimePatternList 2$^{nd}$-stage SCI format—2 bits as defined in Table 5

Beta offset indicator—2 bits as provided by higher layer parameter sl-BetaOffsets2ndSCI Number of DMRS port—1 bit as defined in Table 6

Modulation and coding scheme—5 bits

Additional MCS table indicator—1 bit if one MCS table is configured by higher layer parameter sl-Additional-MCS-Table; 2 bits if two MCS tables are configured by higher layer parameter sl- Additional-MCS-Table; 0 bit otherwise PSFCH overhead indication—1 bit if higher layer parameter sl-PSFCH-Period=2 or 4; 0 bit otherwise Reserved—a number of bits as determined by higher layer parameter sl-NumReservedBits, with value set to zero.

TABLE 5

| Value of 2nd-stage SCI format field | 2nd-stage SCI format |
| --- | --- |
| 00 | SCI format 2-A |
| 01 | SCI format 2-B |
| 10 | Reserved |
| 11 | Reserved |

TABLE 6

| Value of the Number of DMRS port field | Antenna ports |
| --- | --- |
| 0 | 1000 |
| 1 | 1000 and 1001 |

Hereinafter, an example of SCI format 2-A will be described. SCI format 2-A is used for the decoding of PSSCH, with HARQ operation when HARQ-ACK information includes ACK or NACK, when HARQ-ACK information includes only NACK, or when there is no feedback of HARQ-ACK information.

The following information is transmitted by means of the SCI format 2-A:
HARQ process number—4 bits
New data indicator—1 bit
Redundancy version—2 bits
Source ID—8 bits
Destination ID—16 bits
HARQ feedback enabled/disabled indicator—1 bit
Cast type indicator—2 bits as defined in Table 7
CSI request—1 bit

TABLE 7

| Value of Cast type indicator | Cast type |
| --- | --- |
| 00 | Broadcast |
| 01 | Groupcast when HARQ-ACK information includes ACK or NACK |

TABLE 7-continued

| Value of Cast type indicator | Cast type |
| --- | --- |
| 10 | Unicast |
| 11 | Groupcast when HARQ-ACK information includes only NACK |

Hereinafter, an example of SCI format 2-B will be described. SCI format 2-B is used for the decoding of PSSCH, with HARQ operation when HARQ-ACK information includes only NACK, or when there is no feedback of HARQ-ACK information.

SCI format 2-B is used for the decoding of PSSCH, with HARQ operation when HARQ-ACK information includes only NACK, or when there is no feedback of HARQ-ACK information.

The following information is transmitted by means of the SCI format 2-B:
HARQ process number—4 bits
New data indicator—1 bit
Redundancy version—2 bits
Source ID—8 bits
Destination ID—16 bits
HARQ feedback enabled/disabled indicator—1 bit
Zone ID—12 bits
Communication range requirement—4 bits determined by higher layer parameter sl-ZoneConfigMCR-Index Referring to (a) or (b) of FIG. 6, in step S630, the first UE may receive the PSFCH. For example, the first UE and the second UE may determine a PSFCH resource, and the second UE may transmit HARQ feedback to the first UE using the PSFCH resource. Referring to (a) of FIG. 6, in step S640, the first UE may transmit SL HARQ feedback to the base station through the PUCCH and/or the PUSCH.

Hereinafter, UE procedure for reporting HARQ-ACK on sidelink will be described.

A UE can be indicated by an SCI format scheduling a PSSCH reception, in one or more sub-channels from a number of N$^{PSSCH}_{subch}$ sub-channels, to transmit a PSFCH with HARQ-ACK information in response to the PSSCH reception. The UE provides HARQ-ACK information that includes ACK or NACK, or only NACK.

A UE can be provided, by sl-PSFCH-Period-r16, a number of slots in a resource pool for a period of PSFCH transmission occasion resources. If the number is zero, PSFCH transmissions from the UE in the resource pool are disabled. A UE expects that a slot t'$_k^{SL}$ (0≤k<T'$_{max}$) has a PSFCH transmission occasion resource if k mod N$^{PSFCH}_{PSSCH}$=0, where t'$_k^{SL}$ is a slot that belongs to the resource pool, T'$_{max}$ is a number of slots that belong to the resource pool within 10240 msec, and N$^{PSFCH}_{PSSCH}$ is provided by sl-PSFCH-Period-r16. A UE may be indicated by higher layers to not transmit a PSFCH in response to a PSSCH reception. If a UE receives a PSSCH in a resource pool and the HARQ feedback enabled/disabled indicator field in an associated SCI format 2-A or a SCI format 2-B has value 1, the UE provides the HARQ-ACK information in a PSFCH transmission in the resource pool. The UE transmits the PSFCH in a first slot that includes PSFCH resources and is at least a number of slots, provided by sl-MinTimeGapPSFCH-r16, of the resource pool after a last slot of the PSSCH reception.

A UE is provided by sl-PSFCH-RB-Set-r16 a set of M$^{PSFCH}_{PRB,set}$ PRBs in a resource pool for PSFCH transmission in a PRB of the resource pool. For a number of $N_{subch}$ sub-channels for the resource pool, provided by sl-NumSubchannel, and a number of PSSCH slots associated with a PSFCH slot that is less than or equal to $N^{PSFCH}_{PSSCH}$, the UE allocates the $[(i+j\cdot N^{PSFCH}_{PSSCH})\cdot M^{PSFCH}_{subch,slot}, (i+1+j\cdot N^{PSFCH}_{PSSCH})\cdot M^{PSFCH}_{subch,slot}-1]$ PRBs from the $M^{PSFCH}_{PRB,set}$ PRBs to slot i among the PSSCH slots associated with the PSFCH slot and sub-channel j, where $M^{PSFCH}_{subch,slot}=M^{PSFCH}_{PRB,set}/(N_{subch}\cdot N^{PSFCH}_{PSSCH})$, $0\le i<N^{PSFCH}_{PSSCH}$, $0\le j<N_{subch}$, and the allocation starts in an ascending order of i and continues in an ascending order of j. The UE expects that $M^{PSFCH}_{PRB,set}$ is a multiple of $N_{subch}\cdot N^{PSFCH}_{PSSCH}$.

A UE determines a number of PSFCH resources available for multiplexing HARQ-ACK information in a PSFCH transmission as $R^{PSFCH}_{PRB,CS}=N^{PSFCH}_{type}\cdot M^{PSFCH}_{subch,slot}\cdot N^{PSFCH}_{CS}$ where $N^{PSFCH}_{CS}$ is a number of cyclic shift pairs for the resource pool and, based on an indication by higher layers, $N^{PSFCH}_{type}=1$ and the $M^{PSFCH}_{subch,slot}$ PRBs are associated with the starting sub-channel of the corresponding PSSCH $N^{PSFCH}_{type}=N^{PSSCH}_{subch}$ and the $N^{PSSCH}_{subch}\cdot M^{PSFCH}_{subch,slot}$ PRBs are associated with one or more sub-channels from the $N^{PSSCH}$subch sub-channels of the corresponding PSSCH The PSFCH resources are first indexed according to an ascending order of the PRB index, from the $N^{PSFCH}_{type}\cdot M^{PSFCH}_{subch,slot}$ PRBs, and then according to an ascending order of the cyclic shift pair index from the $N^{PSFCH}_{CS}$ cyclic shift pairs.

A UE determines an index of a PSFCH resource for a PSFCH transmission in response to a PSSCH reception as $(P_{ID}+M_{ID})$ mod $R^{PSFCH}_{PRB,CS}$ where $P_{ID}$ is a physical layer source ID provided by SCI format 2-A or 2-B scheduling the PSSCH reception, and $M_{ID}$ is the identity of the UE receiving the PSSCH as indicated by higher layers if the UE detects a SCI format 2-A with Cast type indicator field value of "01"; otherwise, MID is zero.

A UE determines a mo value, for computing a value of cyclic shift a, from a cyclic shift pair index corresponding to a PSFCH resource index and from $N^{PSFCH}_{CS}$ using Table 8.

TABLE 8

| | $m_0$ | | | | | |
|---|---|---|---|---|---|---|
| $N_{CS}^{PSFCH}$ | cyclic shift pair index 0 | cyclic shift pair index 1 | cyclic shift pair index 2 | cyclic shift pair index 3 | cyclic shift pair index 4 | cyclic shift pair index 5 |
| 1 | 0 | — | — | — | — | — |
| 2 | 0 | 3 | — | — | — | — |
| 3 | 0 | 2 | 4 | — | — | — |
| 6 | 0 | 1 | 2 | 3 | 4 | 5 |

A UE determines a $m_{cs}$ value, for computing a value of cyclic shift α, as in Table 9 if the UE detects a SCI format 2-A with Cast type indicator field value of "01" or "10", or as in Table 10 if the UE detects a SCI format 2-B or a SCI format 2-A with Cast type indicator field value of "11". The UE applies one cyclic shift from a cyclic shift pair to a sequence used for the PSFCH transmission.

TABLE 9

| HARQ-ACK Value | 0 (NACK) | 1 (ACK) |
|---|---|---|
| Sequence cyclic shift | 0 | 6 |

TABLE 10

| HARQ-ACK Value | 0 (NACK) | 1 (ACK) |
|---|---|---|
| Sequence cyclic shift | 0 | N/A |

Figure 7:
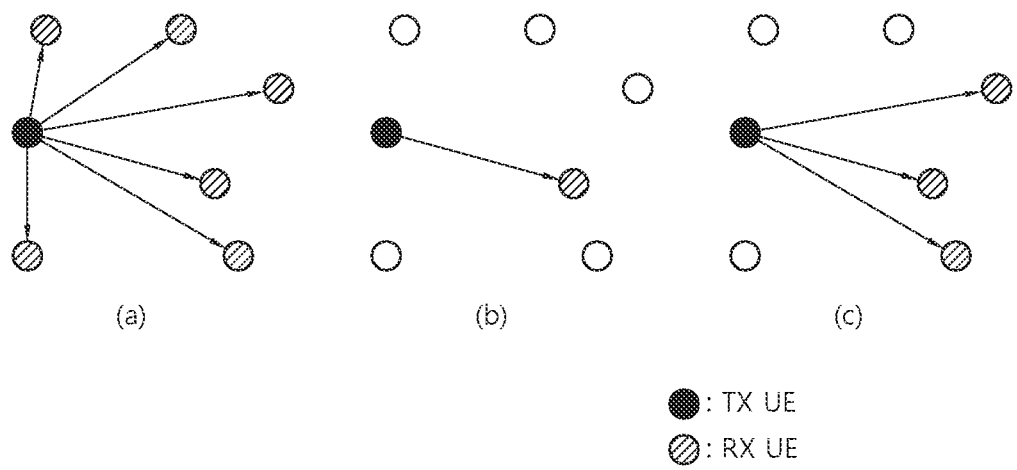
FIG. 7 shows three cast types, based on an embodiment of the present disclosure.

FIG. 7 shows three cast types, based on an embodiment of the present disclosure. The embodiment of FIG. 7 may be combined with various embodiments of the present disclosure. Specifically, (a) of FIG. 7 shows broadcast-type SL communication, (b) of FIG. 7 shows unicast type-SL communication, and (c) of FIG. 7 shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

For example, the SL DRX configuration may include one or more pieces of information listed below.

For example, SL drx-onDurationTimer may be information on the duration at the beginning of a DRX Cycle. For example, the start period of the DRX cycle may be information on the period in which the UE operates in an active mode to transmit or receive sidelink data.

For example, SL drx-SlotOffset may be information on the delay before starting the drx-onDurationTimer of drx-onDurationTimer.

For example, SL drx-InactivityTimer may be information on the duration after the PSCCH occasion in which a PSCCH indicates a new sidelink transmission and reception for the MAC entity. For example, when the transmitting UE instructs PSSCH transmission through the PSCCH, the transmitting UE operates in an active mode while the SL drx-InactivityTimer is running and may transmit the PSSCH to the receiving UE. Also, for example, when the receiving UE is instructed that the transmitting UE transmits the PSSCH through PSCCH reception, the receiving UE operates in an active mode while SL drx-InactivityTimer is running and may receive the PSSCH from the transmitting UE.

For example, SL drx-RetransmissionTimer may be information on the maximum duration until a retransmission is received. For example, the SL drx-RetransmissionTimer may be configured for each HARQ process.

For example, SL drx-LongCycleStartOffset may be information on the Long DRX cycle and drx-StartOffset which defines the subframe where the Long and Short DRX Cycle starts.

For example, SL drx-ShortCycle may be information on the Short DRX cycle. For example, SL drx-ShortCycle may be optional information.

For example, SL drx-ShortCycleTimer may be information on the duration the UE shall follow the Short DRX cycle. For example, SL drx-ShortCycleTimer may be optional information.

For example, SL drx-HARQ-RTT-Timer may be information on the minimum duration before an assignment for HARQ retransmission is expected by the MAC entity. For example, the SL drx-HARQ-RTT-Timer may be configured for each HARQ process.

On the other hand, NR V2X based on release 16 did not support a power saving operation of UE, and NR V2X based on release 17 can support the power saving operation of a UE (e.g. power saving UE). Accordingly, SL DRX configuration for the power saving operation (e.g. SL DRX operation) of the UE may need to be defined.

In various embodiments of the present disclosure, an SL DRX configuration for a power saving operation of a UE is defined, and a method for enabling the UE to smoothly perform an SL DRX operation using the defined SL DRX configuration is proposed. In the following description, 'when, if, in case of' may be replaced with 'based on'.

In the following description, the names of timers (Uu DRX HARQ RTT TimerSL, Uu DRX Retransmission TimerSL, SL DRX OnDuration Timer, SL DRX Inactdivity Timer, SL DRX HARQ RTT Timer, SL DRX Retransmission Timer, etc.) are exemplary purpose only and a timer performing the same/similar function based on the contents described in each timer may be regarded as the same/similar timer regardless of their name.

Figure 8:
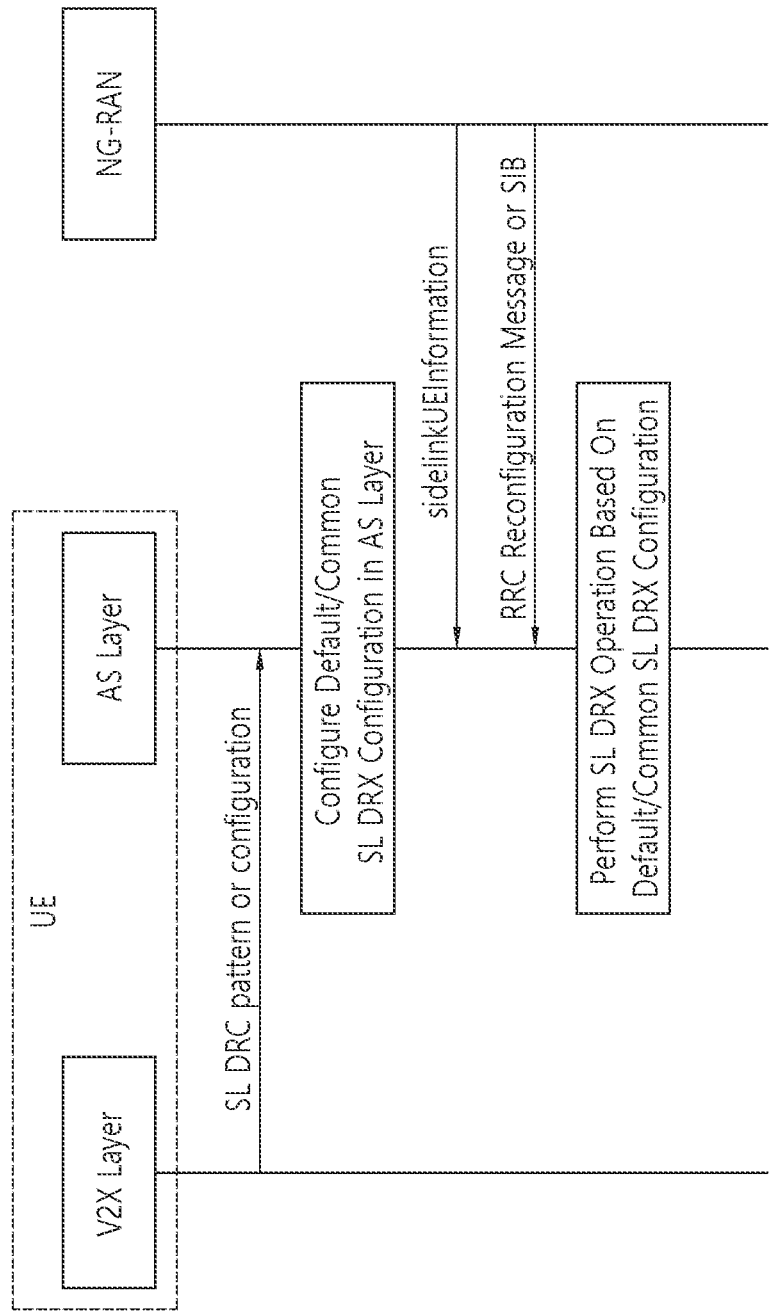
FIG. 8 shows a procedure for a UE to perform an SL DRX operation based on a default/common SL DRX configuration according to an embodiment of the present disclosure.

FIG. 8 shows a procedure for a UE to perform an SL DRX operation based on a default/common SL DRX configuration according to an embodiment of the present disclosure. The embodiment of FIG. 8 may be combined with various embodiments of the present disclosure.

Referring to FIG. 8, an embodiment of configuring one default/common SL DRX configuration for a UE based on Quality of Service (QoS) requirements of a V2X service or a sidelink service is shown. For example, (step 1) the V2X layer of the UE may generate an SL DRX pattern for the SL DRX operation of the UE (for example, SL DRX cycle, SL DRX on-duration) based on the QoS requirements of the V2X service created in the application layer and may deliver it to the AS layer, or may generate SL DRX configuration and may deliver it to the AS layer.

(step 2) And, the AS layer of the UE may generate a default/common SL DRX configuration based on the SL DRX pattern information (SL DRX cycle and SL DRX on-duration length, or SL DRX on-duration length and SL DRX off-duration length) received in the V2X layer, and may utilize the default/common SL DRX configuration for SL DRX operation.

(step 3) And, the UE may transmit QoS requirement information (PFI, PDB) for the V2X service of the UE and a preferred default/common SL DRX configuration to the BS. For example, if the steps 1 and 2 are omitted, only QoS requirement information for V2X service may be transmitted to the BS, and the BS may generate common SL DRX configuration information to be used by UEs based on the information and may deliver it to the UEs.

(step 4) The UE may perform SL DRX operation and sidelink transmission/reception using the common SL DRX configuration received from the BS.

According to an embodiment of the present disclosure, when only one default/common SL DRX configuration is allowed based on the QoS requirements of the V2X service or SL service, problems in which the probability of resource collision between different UEs on the SL DRX on-duration period of the SL DRX configuration and the level of congestion/interference increases may occur. Therefore, in this embodiment, a method for reducing the resource collision probability between different UEs in the SL DRX on-duration period of the common SL DRX configuration is proposed as follows.

For example, a wakeup start time of a common SL DRX configuration, a start time of an SL DRX cycle, a wakeup duration (SL DRX on-duration length) or a wakeup duration of a common SL DRX configuration (e.g. common SL DRX cycle) may be defined to be determined based on parameters including an application/service ID (and/or (L1 or L2) (source/destination ID)), etc. The probability of resource collision between different UEs performing SL DRX operation may be reduced. For example, the wake-up time may include an SL DRX on-duration start time. For example, the method of determining the wakeup start time of the common SL DRX configuration, the start time of the SL DRX cycle, a period at which the wakeup duration or the wakeup duration of the common SL DRX configuration is repeated may include a method for determining through hopping/randomize.

In addition, for example, it is possible to allow a plurality of common SL DRX configurations specifically for V2X or SL service/QoS. Here, the UE may randomly select one of them (or may select it depending on UE's implementation), or the UE may preferentially select a common SL DRX configuration having relatively low interference level based on (past) measured interference level or the like over a reception slot related to the wake-up period of the common SL DRX configuration (e.g. common SL DRX on-duration) related. Or, for example, the UE may randomly select one of the common SL DRX configurations less than or equal to a threshold value configured specifically for service/QoS in advance.

According to an embodiment of the present disclosure, a default/common SL DRX configuration (or a default/common SL DRX pattern) or SL DRX related parameters included in a default/common SL DRX configuration can randomly be selected. In addition, if the conditions described in the proposal are satisfied, the UE may increase the SL DRX on-duration (or active time period), or may apply a previously configured SL DRX timer value (e.g. relatively large value). That is, for example, in order to select a resource with less interference, the UE may extend the time domain of the candidate resource. For example, the conditions described in the proposal include a situation in which a resource collision probability between different UEs or the congestion/interference level increases, a situation in which a resource collision probability between different UEs exceeds a threshold, or a situation in which the congestion/interference level between different UEs exceeds a threshold. For example, the previously configured SL DRX timer may include an SL DRX timer included in the SL DRX configuration described in this disclosure, or an SL DRX related timer defined to support other SL DRX operations.

According to an embodiment of the present disclosure, congestion/interference level hysteresis can be configured when the selected default/common SL DRX configuration (or default/common SL DRX pattern) or SL DRX related parameters included in the default/common SL DRX configuration is switched to other default/common SL DRX configuration (or default/common SL DRX pattern) or SL DRX related parameters included in default/common SL DRX configuration. For example, the UE is allowed to switch to new common SL DRX configuration, a common SL DRX pattern or a parameter of a common SL DRX configuration only when the congestion/interference level difference on the existing/new configuration or pattern is greater than a pre-configured hysteresis value, and the congestion/interference level on the new configuration or pattern is lower than a pre-configured threshold. In addition, for example, switching to another configuration or pattern is allowed limitedly when a resource reselection is triggered, when TB-related retransmission is completed, when the UE operates in a long DRX operation, or when the UE operates based on SL on-duration after a timer expires.

According to an embodiment of the present disclosure, the (maximum, minimum, or average) transmit power value for a service having low priority/requirement, the (maximum) number of retransmissions related to TB, an upper bound value of a channel occupancy ratio (CR) value, etc. may be limitedly configured in order to reduce interference to a service having high priority/requirement (within the overlapping interval) when SL DRX on-duration or active period related to the service having high priority/requirement overlaps (partly) with SL DRX on-duration or active period related to the service having low priority/requirement. For example, the active period may include SL DRX on-duration and may further include a period in which the UE is in a wakeup state ready to receive or transmit a sidelink signal.

According to an embodiment of the present disclosure, when the zone area in which the UE is located is changed (or when the zone ID in which the UE is located is changed), a random selection to select at least one of common SL DRX configuration, common SL DRX pattern, SL DRX operation parameter included in common SL DRX configuration and DRX operation parameter included in a timer, configuration, pattern, and/or configuration can be triggered or allowed.

According to an embodiment of the present disclosure, when the UE transitions from In-Coverage state to Out-Of-Coverage state or when the UE transitions from Out-of-Coverage state to In-Coverage state, a random selection to select at least one of common SL DRX configuration, common SL DRX pattern, SL DRX operation parameter included in common SL DRX configuration and DRX operation parameter included in a timer, configuration, pattern, and/or configuration can be triggered or allowed.

According to an embodiment of the present disclosure, when the Cell ID in which the UE is located is changed, a random selection to select at least one of common SL DRX configuration, common SL DRX pattern, SL DRX operation parameter included in common SL DRX configuration and DRX operation parameter included in a timer, configuration, pattern, and/or configuration can be triggered or allowed.

According to an embodiment of the present disclosure, when a carrier type (e.g. licensed carrier, ITS-dedicated carrier) of the UE is changed, a random selection to select at least one of common SL DRX configuration, common SL DRX pattern, SL DRX operation parameter included in common SL DRX configuration and DRX operation parameter included in a timer, configuration, pattern, and/or configuration can be triggered or allowed.

According to an embodiment of the present disclosure, when the communication type/direction (e.g. V2P, P2P, P2V) of the UE is changed, a random selection to select at least one of common SL DRX configuration, common SL DRX pattern, SL DRX operation parameter included in common SL DRX configuration and DRX operation parameter included in a timer, configuration, pattern, and/or configuration can be triggered or allowed.

According to an embodiment of the present disclosure, when the remaining battery amount of the UE is changed, a random selection to select at least one of common SL DRX configuration, common SL DRX pattern, SL DRX operation parameter included in common SL DRX configuration and DRX operation parameter included in a timer, configuration, pattern, and/or configuration can be triggered or allowed.

According to an embodiment of the present disclosure, when the V2X (or SL) service ID/type of the UE is changed, a random selection to select at least one of common SL DRX configuration, common SL DRX pattern, SL DRX operation parameter included in common SL DRX configuration and DRX operation parameter included in a timer, configuration, pattern, and/or configuration can be triggered or allowed.

According to an embodiment of the present disclosure, when (default/common) SL DRX pattern/configuration information is exchanged via higher layer signaling, a mechanism may be required to have a common understanding for the start time of the (default/common) SL DRX pattern/configuration between UEs (e.g. an SL DRX on-duration start time point). Therefore, in the present disclosure, an SL DRX confirmation message (e.g. a message for reporting SL DRX pattern/configuration information or an ACK message for an SL DRX pattern/configuration report message) is defined, and a method for considering the time at which the UE receives the message as reference timing (e.g. SL DRX on-duration start time), a method for signaling information on reference timing related to an SL DRX pattern through additional higher layer signaling, or a method of considering the time point at which a preconfigured/exchanged slot offset value is applied from a SYNC source-based DFN 0 as a reference timing is proposed. For example, the SL DRX pattern/configuration information may include SL DRX cycle, SL DRX on-duration interval information, and the like. For example, the higher layer signaling may include an MAC CE and PC5 RRC. For example, the additional higher layer signaling may include an SL DRX confirmation message, an SIB, a DL dedicated RRC message, and/or a PC5 RRC message.

In various embodiments of the present disclosure, a common sidelink DRX configuration/parameter may include a DRX configuration/parameter commonly used with all UEs regardless of a cast type (e.g. unicast, groupcast, or broadcast). Or, for example, the common sidelink DRX configuration/parameter may be a DRX configuration/parameter configured for each specific cast type (e.g. unicast, groupcast, or broadcast). Here, for example, the common sidelink DRX configuration may be a default sidelink DRX configuration. For example, the common sidelink DRX configuration/parameter may be a DRX configuration/parameter commonly used by UEs belonging to or subscribing to the same groupcast service. For example, the same groupcast service may include a groupcast service having the same groupcast destination layer 2 ID. For example, the common sidelink DRX configuration/parameter may be a DRX configuration/parameter commonly used by UEs belonging to or subscribing to the same unicast service. For example, the same unicast service may include a unicast service having a pair of the same source layer 2 ID/destination layer 2 ID. For example, the common sidelink DRX configuration/parameter may be a DRX configuration/parameter commonly used by UEs belonging to or subscribing to the same broadcast service. For example, the same broadcast service may include a broadcast service having the same broadcast destination layer 2 ID.

Or, for example, the common sidelink DRX configuration/parameter may be a DRX configuration/parameter configured for each specific cast type (e.g. unicast, groupcast, or broadcast). For example, the common sidelink DRX configuration/parameter may be a DRX configuration/parameter commonly used by UEs interested in a service. Here, for example, the service may be at least one of a groupcast service having the same groupcast destination layer 2 ID, a unicast service having a pair of the same source layer 2 ID/destination layer 2 ID, and a broadcast service having the same broadcast destination layer 2 ID. For example, in the case of not being subscribed to or connected to the service related to the cast type, UEs interested in the service may include UEs interested in subscribing to the service related to the cast type and monitoring a signal related to the service. Here, for example, the DRX configuration/parameter may include a UE service specific DRX configuration commonly used by UEs interested in the service.

For example, when the UE is not connected to a service related to unicast, the UE may monitor a signal related to the service. In this case, for example, the UE may use a default/common sidelink DRX configuration to monitor the signal related to the service. Here, for example, the default/common sidelink DRX configuration may be a default/common sidelink DRX configuration for groupcast or broadcast. Additionally, here, for example, the service related to unicast may include a service related to a QoS profile that cannot be mapped to a DRX configuration configured for a dedicated QoS profile. Here, for example, the signal related to the service may include a message (e.g. a direct communication request (DCR) message) for establishing a unicast connection. Here, for example, a service related to a QoS profile that is not mapped to a non-default DRX configuration may include a message (e.g. a DCR message) for establishing a unicast connection.

Additionally, for example, a common DRX configuration for groupcast and/or broadcast may be used to receive a message for establishing a unicast link.

For example, a default DRX configuration common between groupcast and broadcast may be used for a QoS profile that is not mapped to a non-default DRX configuration.

For example, for groupcast and broadcast, the default DRX configuration may be used for QoS profiles that cannot be mapped to DRX configuration configured for dedicated QoS profiles.

For example, a parameter (e.g. sl-DRX-ConfigCommon-GC-BC field) related to a default DRX configuration may indicate a sidelink DRX configuration for groupcast and broadcast communication. Here, for example, parameters related to the default DRX configuration may be received from an BS.

For example, the above-described common sidelink DRX configuration or UE service specific sidelink DRX configuration commonly used by UEs may be composed of or configured in the following combination.

For example, a common sidelink DRX configuration or a UE service specific sidelink DRX configuration may be configured for each cast type. For example, the cast type may include a unicast service, a groupcast service, and a broadcast service.

For example, a common sidelink DRX configuration or a UE service specific sidelink DRX configuration may be configured for each source/destination pair. For example, the common sidelink DRX configuration or the UE service specific sidelink DRX configuration may be configured for each pair of source L1 or L2 ID/destination L1 or L2 ID. Here, for example, L1 denotes layer 1 and L2 denotes layer 2.

For example, a common sidelink DRX configuration or a UE service specific sidelink DRX configuration may be configured for each service. For example, the common sidelink DRX configuration or the UE service specific sidelink DRX configuration may be configured for each PC5 5G QoS Indicator (5QI) (PQI). For example, the common sidelink DRX configuration or the UE service specific sidelink DRX configuration may be configured for each packet delay budget (PDB).

For example, the common sidelink DRX configuration or the UE service specific sidelink DRX configuration may be configured for each Provider Service Identifier (PS ID).

For example, a common sidelink DRX configuration or a UE service specific sidelink DRX configuration may be configured based on a service and a cast type. Here, for example, the service may include PQI and PS ID. For example, the common sidelink DRX configuration or the UE service specific sidelink DRX configuration may be configured for each combination of service and cast type.

For example, a common sidelink DRX configuration or a UE service specific sidelink DRX configuration may be configured based on a service and a destination. For example, the service may include PQI and PS ID. For example, the common sidelink DRX configuration or the UE service specific sidelink DRX configuration may be configured for each combination of service and destination. For example, the destination may include a groupcast ID or a broadcast ID. For example, in the case of groupcast or broadcast, the common sidelink DRX configuration or the UE service specific sidelink DRX configuration may be configured based on a groupcast ID or a broadcast ID.

For example, since the destination layer 2 ID can be used as an ID to identify groupcast/broadcast service, a common sidelink DRX configuration or a UE service specific sidelink DRX configuration can be configured for each destination layer 2 ID. In this case, for example, the common sidelink DRX configuration or a UE service specific sidelink DRX configuration may be configured by considering the PQI of the sidelink data for each destination layer 2 ID.

For example, in the case of group cast or broadcast, a common sidelink DRX configuration or a UE service specific sidelink DRX configuration may be configured based on a service and a pair of source and destination. For example, the service may include PQI and PS ID. For example, the common sidelink DRX configuration or the UE service specific sidelink DRX configuration may be configured for a combination of a service and a pair of source and destination. For example, the pair of source and destination may include a pair of source L1 or L2 ID and destination L1 or L2 ID.

Also, for example, the sidelink DRX configuration may include DRX configuration information applied by a receiving UE which receives sidelink data. Accordingly, from the viewpoint of the receiving UE, the source layer 2 ID is the destination layer 2 ID of the transmitting UE, and the destination layer 2 ID is the source layer 2 ID of the transmitting UE. That is, for example, from the viewpoint of the receiving UE, the sidelink DRX configuration may be configured for each pair of source L2 ID/destination L2 ID, and the receiving UE may utilize the sidelink DRX configuration. Also, for example, the transmitting UE may serve as a receiving UE that receives SL data transmitted by other UEs like the receiving UE. That is, for example, the transmitting UE may configure the sidelink DRX configuration for each pair of source L2 ID/destination L2 ID while also performing the role of the receiving UE, and may utilize the sidelink DRX configuration. That is, for example, the sidelink DRX configuration is configured and utilized for each pair of source L2 ID/destination L2 ID according to the transmission/reception direction of sidelink data (e.g. from the transmitting UE to the receiving UE, from the receiving UE to the transmitting UE).

For example, in the case of unicast, a common sidelink DRX configuration or a UE service specific sidelink DRX configuration may be configured based on a service and a pair of source/destination. For example, the common sidelink DRX configuration or the UE service specific sidelink DRX configuration may be configured for a combination of a service and a pair of source/destination. Here, for example, the service may include PQI and PS ID. For example, the pair of source/destination pair may include a pair of a source L1 or L2 ID and destination L1 or L2 ID.

For example, since a pair of the source L2 ID/destination L2 ID can be used as an identifier to distinguish the PC5 unicast link, the UE may configure the UE service specific sidelink DRX configuration for each PC5 unicast link or each PC5 RRC connection. Here, for example, the PC5 RRC connection may include a pair of a source L2 ID/destination L2 ID. In this case, for example, the UE service specific sidelink DRX configuration may be configured by reflecting the PQI of sidelink data transmitted and received between UEs in PC5 unicast link or PC5 RRC connection.

For example, since a pair of the source L2 ID/destination L2 ID can be used as an identifier to distinguish the PC5 unicast link, the UE may configure the UE service specific sidelink DRX configuration for each PC5 unicast link or each PC5 RRC connection. Here, for example, the PC5 RRC connection may include a pair of a source L2 ID/destination L2 ID. In this case, for example, the UE service specific sidelink DRX configuration may be configured by reflecting the PQI of sidelink data transmitted and received between UEs in PC5 unicast link or PC5 RRC connection.

For example, the common sidelink DRX configuration or the UE service specific sidelink DRX configuration may be configured as a combination of at least two of a service, source/destination pair, destination layer 1 ID or layer 2 ID, source layer 1 ID or source layer 2 ID, a cast type and PDB. For example, the service may include a PQI or a PSID. For example, the source/destination pair may include a pair of source layer 1 ID or source layer 2 ID/destination layer 1 ID or layer 2 ID.

According to an embodiment of the present disclosure, a dedicated common SL DRX configuration for a UE having a PC5 unicast connection or a PC5 RRC connection may be defined. For example, the dedicated common SL DRX configuration for the UE desiring to establish the PC5 unicast connection or the PC5 RRC connection may be defined.

For example, a requirement time from establishing a PC5 unicast connection to use the service may vary between a UE using a voice over internet protocol (VoIP) service (e.g. a unicast service) and a UE using an autonomous driving service. Here, for example, the autonomous driving service may include a message transmission/reception service for group driving, and the autonomous driving service may include a broadcast service. That is, for example, before establishing a PC5 unicast connection or a PC5 RRC connection, the SL DRX configuration used for receiving messages exchanged between UEs may not need to be the same configuration. Here, for example, the SL DRX configuration may include at least one of a DRX cycle and an SL DRX on-duration timer. For example, in the PC5 unicast-specific common SL DRX configuration used for a service requiring a fast PC5 unicast connection or a PC5 RRC connection, the DRX cycle or SL DRX on-duration timer may have a short value.

For example, the PC5 unicast-specific common SL DRX configuration proposed in the present disclosure may be a common SL DRX configuration that can be commonly used by UEs that have established all PC5 unicast connections or PC5 RRC connections. For example, UEs that have established the PC5 unicast connection or the PC5 RRC connection may include UEs that want to establish the PC5 unicast connection or the PC5 RRC connection.

Or, for example, the PC5 unicast specific common SL DRX configuration proposed in the present disclosure is a common SL DRX specific to a PC5 unicast connection or PC5 RRC connection, which can be used by UEs that have established a specific PC5 unicast connection or PC5 RRC connection. For example, UEs that have established the PC5 unicast connection or the PC5 RRC connection may include UEs that want to establish the PC5 unicast connection or the PC5 RRC connection. That is, for example, the PC5 unicast specific common SL DRX configuration proposed in the present disclosure may be a common SL DRX configuration for UEs that have a PC5 unicast connection or PC5 RRC connection having the same source layer 2 ID/destination layer 2 ID pair. For example, since unicast communication is bidirectional communication, the SL DRX configuration applied by the receiving UE may be applied to a different value for each direction of unicast communication. Therefore, for example, the PC5 unicast-specific common SL DRX configuration proposed in the present disclosure may be configured for each direction for pair of source layer 2 ID/destination layer 2 ID.

The PC5 unicast specific common SL DRX configuration or PC5 RRC connection specific common SL DRX configuration proposed in the present disclosure may be used for various purposes as follows.

For example, before establishing a PC5 unicast connection or a PC5 RRC connection, a UE may use a common SL DRX configuration to transmit/receive messages exchanged between UEs. Here, for example, the common SL DRX configuration may be a common SL DRX configuration specific to a PC5 unicast connection or a common SL DRX configuration specific to a PC5 RRC connection. For example, the UEs may include UEs performing SL DRX operation and power saving UEs. For example, messages exchanged between UEs include a PC5-S Direct Communication request/response message, another PC5-S message exchanged to establish a PC5 unicast link, and a PC5 RRC message exchanged for UE capability negotiation.

For example, before a UE establishing a PC5 unicast connection or PC5 RRC connection establishes anew PC5 unicast connection or PC5 RRC connection with another UE, in order to transmit/receive messages exchanged between UEs, the UE may utilize a common SL DRX configuration. Here, for example, the common SL DRX configuration may be a common SL DRX configuration specific to a PC5 unicast connection or a common SL DRX configuration specific to a PC5 RRC connection. For example, the UEs may include UEs performing SL DRX operation and power saving UEs. For example, messages exchanged between UEs include a PC5-S Direct Communication request/response message, another PC5-S message exchanged to establish a PC5 unicast link, and a PC5 RRC message exchanged for UE capability negotiation.

For example, a UE that has established a PC5 unicast connection or a PC5 RRC connection may use a common SL DRX configuration to monitor channels or signals of other UE. Here, for example, the common SL DRX configuration may be a common SL DRX configuration specific to a PC5 unicast connection or a common SL DRX configuration specific to a PC5 RRC connection. For example, the UEs may include UEs performing SL DRX operation and power saving UEs. For example, the channel may include at least one of PSCCH, PSSCH, PSFCH, and PSBCH. For example, the signal may include S-SSB.

According to various embodiments of the present disclosure, a configuration of a sidelink DRX timer for a power saving operation of a UE is defined, and a method by the UE to efficiently perform a sidelink DRX operation using the defined configuration of the sidelink DRX timer is proposed.

According to an embodiment of the present disclosure, a sidelink DRX timer used for sidelink unicast communication (e.g. a sidelink DRX on-duration timer, a sidelink DRX inactivity timer, a sidelink DRX HARQ RTT timer, sidelink DRX retransmission timer) can be configured as follows.

That is, for example, the sidelink DRX timer used for SL unicast may be configured to use an independent value for each unicast. Here, for example, the sidelink DRX timer used for SL unicast may include at least one of a sidelink DRX on-duration timer, a sidelink DRX inactivity timer, a sidelink DRX HARQ RTT timer or a sidelink DRX retransmission timer. For example, the sidelink DRX timer used for SL unicast may be configured to use an independent value for each PC5 unicast link identifier. For example, the sidelink DRX timer used for SL unicast may be configured to use an independent value for each pair of the same source layer 1 ID or layer 2 ID/destination layer 1 ID or layer 2 ID. For example, the sidelink DRX timer used for SL unicast may be configured to use an independent value for each unicast service. Here, for example, the unicast service may include PQI and PDB. For example, the sidelink DRX timer used for SL unicast may be configured to use an independent value for each destination layer 1 ID or layer 2 ID. For example, the sidelink DRX timer used for SL unicast may be configured to use an independent value for each source layer 1 ID or layer 2 ID. In this case, for example, the configuration of sidelink DRX timers for a specific configured unicast may be transmitted to a unicast peer UE through a PC5 RRC message or MAC CE.

Alternatively, for example, the sidelink DRX timer used for SL unicast may be configured to use a value common to all unicast services. In this case, for example, the BS may transmit the configuration of unicast common sidelink DRX timers to UEs through System Information Block (SIB) or a dedicated RRC message. Or, for example, the configuration of the unicast common sidelink DRX timers may be preconfigured, and UEs may use the preconfigured configuration of the unicast common sidelink DRX timers.

According to an embodiment of the present disclosure, the value of the sidelink DRX timer used for sidelink groupcast communication may be configured as follows.

For example, the sidelink DRX timer used for SL groupcast may be configured to use an independent value for each groupcast. For example, the sidelink DRX timer used for SL groupcast may include at least one of a sidelink DRX on-duration timer, a sidelink DRX inactivity timer, a sidelink DRX HARQ RTT timer, or sidelink DRX retransmission timer. For example, the sidelink DRX timer used for SL groupcast may be configured to use an independent value for each groupcast destination layer 2 ID. For example, the sidelink DRX timer used for SL groupcast may be configured to use an independent value for each pair of the same source layer 2 ID/groupcast destination layer 2 ID. For example, the sidelink DRX timer used for SL groupcast may be configured to use an independent value for each groupcast service. Here, for example, the groupcast service may include PQI and PDB. In this case, the configuration of sidelink DRX timers for the configured specific groupcast group may be transmitted to the UE belonging to the counterpart groupcast group through MAC CE.

Or, for example, the sidelink DRX timer used for SL groupcast may be configured to use a common value for all groupcast services. In this case, for example, the BS may transmit the configuration of the groupcast common sidelink DRX timers to the UEs through SIB or dedicated RRC message. Or, for example, the configuration of groupcast common sidelink DRX timers may be preconfigured, and UEs may use the preconfigured configuration of the groupcast common sidelink DRX timers.

According to an embodiment of the present disclosure, the value of the sidelink DRX timer used for sidelink broadcast communication may be configured as follows.

For example, the sidelink DRX timer used for SL broadcast may be configured to use an independent value for each broadcast. For example, the sidelink DRX timer used for SL broadcast may include at least one of a sidelink DRX on-duration timer, a sidelink DRX inactivity timer, a sidelink DRX HARQ RTT timer, or a sidelink DRX retransmission timer. For example, the sidelink DRX timer used for SL broadcast may be configured to use an independent value for each broadcast destination layer 2 ID. For example, the sidelink DRX timer used for SL broadcast may be configured to use an independent value for each pair of the same source layer 2 ID/broadcast destination layer 2 ID. For example, the sidelink DRX timer used for SL broadcast may be configured to use an independent value for each broadcast service. Here, for example, the broadcast service may include PQI and PDB. In this case, the configuration of the sidelink DRX timers for the configured specific broadcast group may be transmitted to the UE belonging to the counterpart broadcast group through MAC CE.

Or, for example, the sidelink DRX timer used for SL broadcast may be configured to use a common value for all broadcast services. In this case, for example, the BSS may transmit the configuration of the broadcast common sidelink DRX timers to UEs through SIB or dedicated RRC message. Or, for example, the configuration of the broadcast common sidelink DRX timers may be preconfigured, and the UEs may use the preconfigured configuration of the broadcast common sidelink DRX timers.

In various embodiments of the present disclosure, the SL DRX timer mentioned below may be used for the following purposes.

For example, the SL DRX on-duration timer may be used in a duration in which a UE performing SL DRX operation basically needs to operate as an active time in order to receive a PSCCH/PSSCH of a counterpart UE.

For example, the SL DRX inactivity timer may be used in a duration for extending the SL DRX on-duration, which is a duration in which a UE performing SL DRX operation should basically operate as an active time to receive a PSCCH/PSSCH of a counterpart UE. That is, for example, the SL DRX on-duration timer may be extended by the SL DRX inactivity timer duration. In addition, when the UE receives new packet (e.g., new PSSCH) from the counterpart UE, the UE may start the SL DRX inactivity timer to extend the SL DRX on-duration timer.

For example, the SL DRX HARQ RTT timer may be used in a duration in which a UE operates in a sleep mode until the UE performing SL DRX operation receives a retransmission packet (or PSSCH assignment) transmitted from a counterpart UE. That is, for example, when the UE starts the SL DRX HARQ RTT timer, the UE can determine that the counterpart UE will not transmit any sidelink retransmission packet to the UE until the SL DRX HARQ RTT timer expires, and can operate in sleep mode while the timer is running.

For example, the SL DRX retransmission timer may be used in a duration in which a UE performing SL DRX operation operates in an active mode to receive a retransmission packet (or PSSCH assignment) transmitted from a counterpart UE. For example, while the SL DRX retransmission timer is running, the UE may monitor reception of a retransmission sidelink packet (or PSSCH allocation) transmitted by the counterpart UE.

Various embodiments of the present disclosure may be used to solve a problem in which a loss occurs due to an interruption occurring when switching the Uu BWP.

Also, for example, when a UE supports multiple SL BWPs, it may be used to solve a problem in which loss occurs due to interruption occurring when switching SL BWP.

Various embodiments of the present disclosure, it may be applied to default/common SL DRX configuration, default/common SL DRX pattern, parameters included in default/common SL DRX configuration or timers included in the default/common SL DRX configuration as well as UE-Pair Specific SL DRX configuration, the UE-pair specific SL DRX pattern, the parameters included in the UE-pair specific SL DRX configuration, and timers included in UE-pair specific SL DRX configuration.

Also, in the present disclosure, for example, 'Onduration' may be an active time duration. For example, the active time may be a duration in which a UE operates in a wake-up state (the RF module is "on") in order to receive/transmit a wireless signal. For example, 'Offduration' may be a sleep time duration. For example, the sleep time may be a duration in which a UE operates in the sleep mode state (the RF module is "off") for power saving. For example, it may not mean that the transmitting UE is obligated to operate in the sleep mode during the sleep time duration. For example, if necessary, the UE may be allowed to operate as an active time for a short time to perform sensing operation/transmission operation even in a sleep time.

For example, whether various embodiments of the present disclosure are applied may be configured independently or differently based on at least one of a resource pool, congestion level, service priority, service type, requirements (e.g., latency, reliability), traffic type (e.g. periodic generation, aperiodic generation), SL transmission resource allocation mode (e.g. mode 1, mode 2).

For example, parameters (e.g. thresholds) related to various embodiments of the present disclosure may be configured independently or differently based on at least one of resource pools, congestion levels, service priorities, service types, requirements (e.g. latency, reliability), traffic types (e.g. periodic generation, aperiodic generation) and SL transmission resource allocation mode (e.g. mode 1, mode 2).

For example, whether various embodiments of the present disclosure are applied may be configured independently or differently for at least one of resource pool, service/packet type, priority, QoS requirements (e.g. reliability, latency, URLLC/EMBB), whether HARQ feedback are enabled, whether HARQ feedback is disabled, LCH, MAC PDU, cast type (e.g. unicast, groupcast, broadcast), congestion level of the resource pool (e.g. CBR), SL HARQ feedback scheme (e.g. NACK-only feedback scheme, ACK/NACK feedback scheme), HARQ feedback-enabled MAC PDU transmission, HARQ feedback-disabled MAC PDU transmission, whether PUCCH-based SL HARQ feedback reporting operation is configured or not, performing preemption, performing re-evaluation, resource reselection, L1 or L2 source identifier, L1 or L2 destination identifier, a combination of source layer ID and destination layer ID, a direction of a pair of source layer ID and destination layer ID, a combination of a pair of source layer ID and destination layer ID pair and a cast type, PC5 RRC connection/link, performing SL DRX, SL mode type (e.g. resource allocation mode 1, resource allocation mode 2), performing periodic resource reservation or performing aperiodic resource reservation.

For example, parameter configuration values related to various embodiments of the present disclosure may be configured independently or differently for at least one of resource pool, service/packet type, priority, QoS requirements (e.g. reliability, latency, URLLC/EMBB), whether HARQ feedback are enabled, whether HARQ feedback is disabled, LCH, MAC PDU, cast type (e.g. unicast, groupcast, broadcast), congestion level of the resource pool (e.g. CBR), SL HARQ feedback scheme (e.g. NACK-only feedback scheme, ACK/NACK feedback scheme), HARQ feedback-enabled MAC PDU transmission, HARQ feedback-disabled MAC PDU transmission, whether PUCCH-based SL HARQ feedback reporting operation is configured or not, performing preemption, performing re-evaluation, resource reselection, L1 or L2 source identifier, L1 or L2 destination identifier, a combination of source layer ID and destination layer ID, a direction of a pair of source layer ID and destination layer ID, a combination of a pair of source layer ID and destination layer ID pair and a cast type, PC5 RRC connection/link, performing SL DRX, SL mode type (e.g. resource allocation mode 1, resource allocation mode 2), performing periodic resource reservation or performing aperiodic resource reservation.

In addition, for example, in the present disclosure, "configuration" or "designation" means that the BS provides a predefined physical layer channel/signal or a higher layer channel/signal (e.g. SIB, RRC, MAC CE) to the UE. For example, "configuration" or "designation" means that it provided through pre-configuration or a UE provides a pre-defined physical layer channel/signal or higher layer channel/signal (e.g. SL MAC CE, PC5 RRC) to other UE. In addition, various embodiments of the present disclosure may be combined with each other.

In the present disclosure, for example, "specific time" may be a time in which a UE operates in an active time for a predefined time for the UE to receive a sidelink signal or sidelink data from a counterpart UE. For example, "specific time" may be a time in which a UE operates in an active time as long as a timer (SL DRX retransmission timer, SL DRX inactivity timer, a timer to ensure that it can operate as an active time in the DRX operation of the RX UE) time to receive a sidelink signal or sidelink data from a counterpart UE.

Various embodiments of the present disclosure may be applied to millimeter wave (mmWave) SL operation. Whether to apply various embodiments of the present disclosure may be applied to mmWave SL operation. Parameter configuration values related to various embodiments of the present disclosure may be applied to mmWave SL operation.

Figure 9:
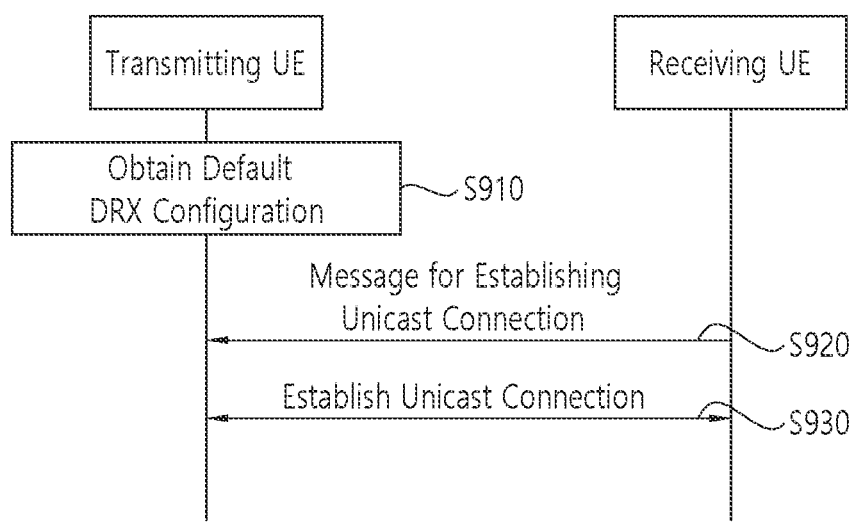
FIG. 9 shows a procedure in which a transmitting UE establishes a unicast connection with a receiving UE according to an embodiment of the present disclosure.

FIG. 9 shows a procedure in which a transmitting UE establishes a unicast connection with a receiving UE according to an embodiment of the present disclosure. The embodiment of FIG. 9 may be combined with various embodiments of the present disclosure.

Referring to FIG. 9, in step S910, the transmitting UE may obtain a default DRX configuration for groupcast or broadcast. For example, the default DRX configuration may include information related to a sidelink DRX cycle and information related to an active time.

In step S920, the transmitting UE may receive a message for establishing a unicast connection from the receiving UE. For example, a message for establishing a unicast connection with the receiving terminal may be received based on the default DRX configuration.

In step S930, the transmitting UE may establish a unicast connection with the receiving UE.

For example, the default DRX configuration may be received through higher layer signaling.

For example, the default DRX configuration may be received through a system information block (SIB).

For example, the default DRX configuration may be configured based on a cast type.

For example, the default DRX configuration may be configured based on a pair of a source and a destination.

For example, the default DRX configuration may be configured based on a service.

For example, the default DRX configuration may be configured based on a combination of a service and a cast type.

For example, the default DRX configuration may be configured based on a combination of a service and a destination.

For example, the default DRX configuration may be configured based on a combination of a service and a pair of a source and a destination.

For example, the time at which the default DRX configuration is received may be determined as a reference timing. For example, the reference timing may include a start time of the SL DRX on-duration.

For example, information on the reference timing related to the default DRX may be received.

For example, the reference timing related to the default DRX may be determined as a time point after a predefined offset value from a time point with DFN=0 based on a synchronization source.

Figure 10:
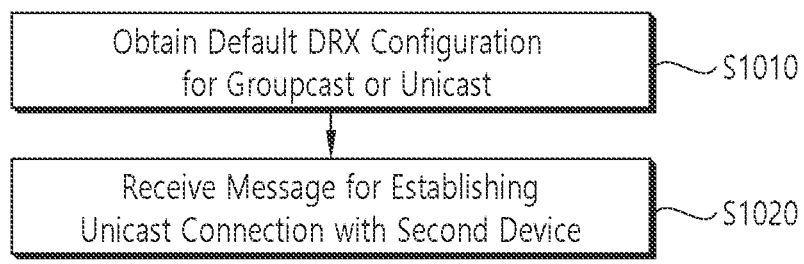
FIG. 10 shows a method for a first device to receive a message for establishing a unicast connection from a second device according to an embodiment of the present disclosure.

FIG. 10 shows a method for a first device to receive a message for establishing a unicast connection from a second device according to an embodiment of the present disclosure. The embodiment of FIG. 10 may be combined with various embodiments of the present disclosure.

Referring to FIG. 10, in step S1010, a first device 100 may obtain a default DRX configuration for groupcast or broadcast. For example, the default DRX configuration may include information related to a sidelink DRX cycle and information related to an active time.

In step S1020, the first device 100 may receive a message for establishing a unicast connection from a second device 200. For example, a message for establishing a unicast connection with the second device 200 may be received based on the default DRX configuration.

For example, the default DRX configuration may be received through higher layer signaling.

For example, the default DRX configuration may be received through a system information block (SIB).

For example, the default DRX configuration may be configured based on a cast type.

For example, the default DRX configuration may be configured based on a pair of a source and a destination.

For example, the default DRX configuration may be configured based on a service.

For example, the default DRX configuration may be configured based on a combination of a service and a cast type.

For example, the default DRX configuration may be configured based on a combination of a service and a destination.

For example, the default DRX configuration may be configured based on a combination of a service and a pair of a source and a destination.

For example, the time at which the default DRX configuration is received may be determined as a reference timing. For example, the reference timing may include a start time of the SL DRX on-duration.

For example, information on the reference timing related to the default DRX may be received.

For example, the reference timing related to the default DRX may be determined as a time point after a predefined offset value from a time point with DFN=0 based on a synchronization source.

The above-described embodiment may be applied to various devices to be described below. For example, the processor 102 of the first device 100 may obtain a default DRX configuration for groupcast or broadcast. And, for example, the processor 102 of the first device 100 may control the transceiver 106 to receive a message for establishing a unicast connection from the second device 200.

According to an embodiment of the present disclosure, a first device for performing wireless communication may be provided. For example, the first device may include one or more memories for storing instructions, one or more transceivers, and one or more processors connecting the one or more memories and the one or more transceivers. For example, the one or more processors execute the instructions to obtain a default discontinuous reception (DRX) configuration for groupcast or broadcast, the default DRX configuration including information related to an SL DRX cycle and an active time, and receive a message for establishing a unicast connection with the second device from the second device. For example, the message for establishing a unicast connection with the second device may be received based on the default DRX configuration.

According to an embodiment of the present disclosure, an apparatus configured to control the first UE may be provided. For example, one or more processors, and one or more memories operably coupled by the one or more processors and storing instructions are included. For example, the one or more processors execute the instructions to obtain a default discontinuous reception (DRX) configuration for groupcast or broadcast, the default DRX configuration including information related to an SL DRX cycle and an active time, and receive a message for establishing a unicast connection with the second UE from the second UE. For example, the message for establishing a unicast connection with the second UE may be received based on the default DRX configuration.

According to an embodiment of the present disclosure, a non-transitory computer-readable storage medium recording instructions may be provided. For example, the instructions, when executed, cause the first device to obtain a default discontinuous reception (DRX) configuration for groupcast or broadcast, the default DRX configuration including information related to an SL DRX cycle and an active time, and receive a message for establishing a unicast connection with the second device from the second device. For example, the message for establishing a unicast connection with the second device may be received based on the default DRX configuration.

Figure 11:
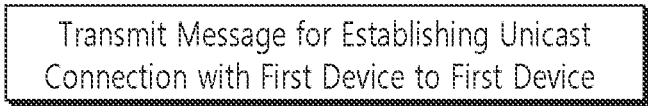
FIG. 11 shows a method for a second device to transmit a message for establishing a unicast connection to a first device according to an embodiment of the present disclosure.

FIG. 11 shows a method for a second device to transmit a message for establishing a unicast connection to a first device according to an embodiment of the present disclosure. The embodiment of FIG. 11 may be combined with various embodiments of the present disclosure.

Referring to FIG. 11, in step S1110, the second device 200 may transmit a message for establishing a unicast connection with the first device 100 to the first device 100.

For example, a message for establishing a unicast connection with the first device 100 may be transmitted based on a default DRX configuration for groupcast or broadcast. For example, the default DRX configuration may be obtained. For example, the default DRX configuration may include information related to an SL DRX cycle and information related to an active time.

For example, the default DRX configuration may be received through higher layer signaling.

For example, the default DRX configuration may be received through a system information block (SIB).

For example, the default DRX configuration may be configured based on a cast type.

For example, the default DRX configuration may be configured based on a pair of a source and a destination.

For example, the default DRX configuration may be configured based on a service.

For example, the default DRX configuration may be configured based on a combination of a service and a cast type.

For example, the default DRX configuration may be configured based on a combination of a service and a destination.

For example, the default DRX configuration may be configured based on a combination of a service and a pair of a source and a destination.

For example, the time at which the default DRX configuration is received may be determined as the reference timing. For example, the reference timing may include a start time of the SL DRX on-duration.

For example, information on the reference timing related to the default DRX may be received.

For example, the reference timing related to the default DRX may be determined as a time point after a predefined offset value from a time point with DFN=0 based on a synchronization source.

The above-described embodiment may be applied to various devices to be described below. First, for example, the processor 202 of the second device 200 may control the transceiver 206 to transmit a message for establishing a unicast connection with the first device 100 to the first device 100.

According to an embodiment of the present disclosure, a second device for performing wireless communication may be provided. For example, the second device may include one or more memories to store instructions, one or more transceivers, and one or more processors connecting the one or more memories and the one or more transceivers. For example, the one or more processors may execute the instructions to send a message to the first device for establishing a unicast connection with the first device. For example, the message for establishing a unicast connection with the first device may be transmitted based on a default discontinuous reception (DRX) configuration for groupcast or broadcast. For example, the default DRX configuration may be obtained, and the default DRX configuration may include information related to an SL DRX cycle and information related to an active time.

Various embodiments of the present disclosure may be combined with each other.

Various embodiments of the present disclosure may be implemented independently. Alternatively, various embodiments of the present disclosure may be implemented in combination with or merged with each other. For example, various embodiments of the present disclosure have been described based on the 3GPP system for convenience of description, but various embodiments of the present disclosure may be extendable to systems other than the 3GPP system. For example, various embodiments of the present disclosure are not limited only to direct communication between UEs, and may be used in uplink or downlink, and in this case, a base station or a relay node may use the method proposed according to various embodiments of the present disclosure. For example, information on whether the method according to various embodiments of the present disclosure is applied may be provided by the base station to the UE or the second device 200 to the receiving UE using a predefined signal (e.g. a physical layer signal or higher layer signal). For example, information on rules according to various embodiments of the present disclosure can be defined through a pre-defined signal (e.g. a physical layer signal or a higher layer signal) from the BS to the UE or the second device 200 to the receiving UE.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 12:
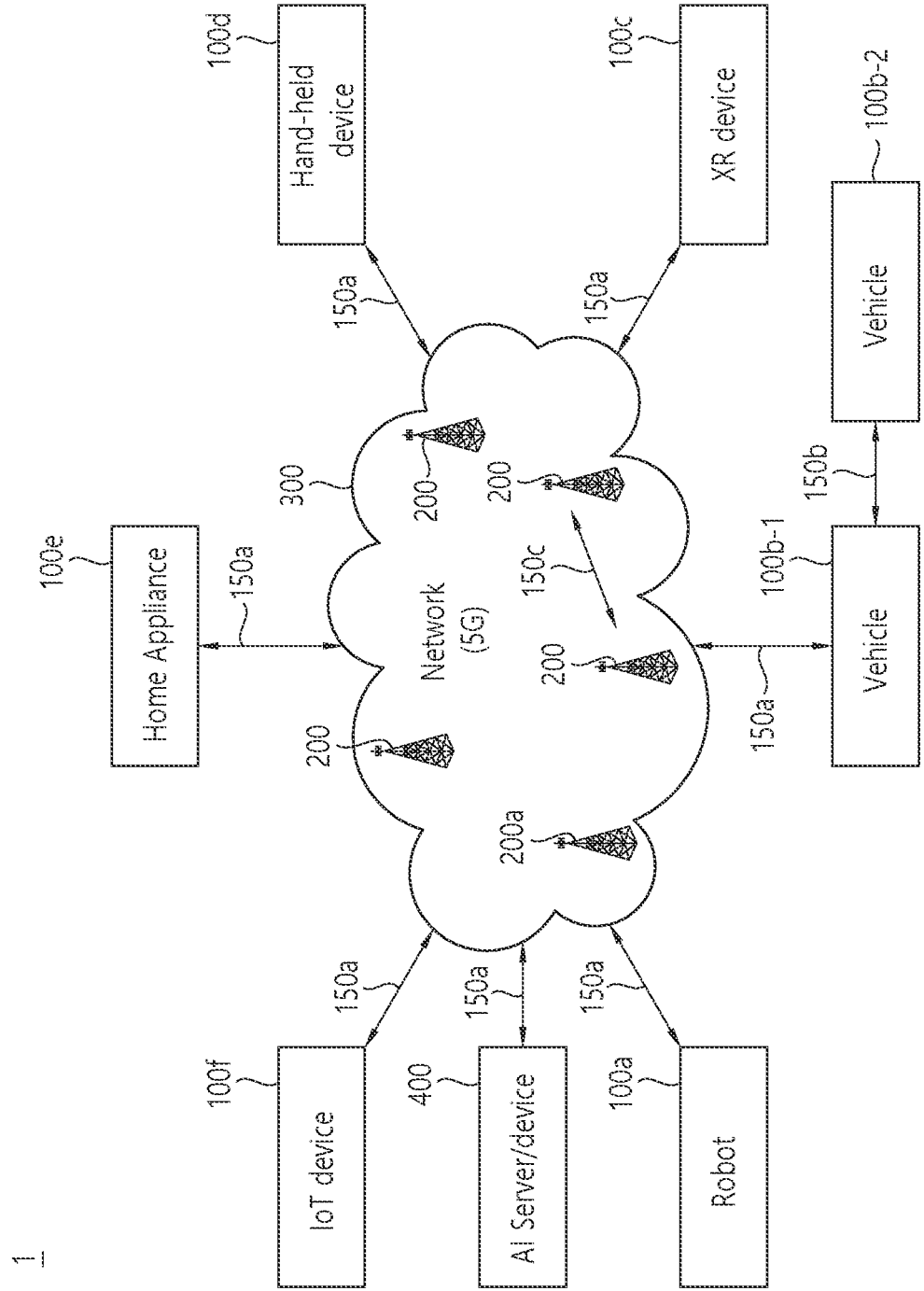
FIG. 12 shows a communication system 1, based on an embodiment of the present disclosure.

FIG. 12 shows a communication system 1, based on an embodiment of the present disclosure. The embodiment of FIG. 12 may be combined with various embodiments of the present disclosure.

Referring to FIG. 12, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

Here, wireless communication technology implemented in wireless devices 100a to 100f of the present disclosure may include Narrowband Internet of Things for low-power communication in addition to LTE, NR, and 6G. In this case, for example, NB-IoT technology may be an example of Low Power Wide Area Network (LPWAN) technology and may be implemented as standards such as LTE Cat NB1, and/or LTE Cat NB2, and is not limited to the name described above. Additionally or alternatively, the wireless communication technology implemented in the wireless devices 100a to 100f of the present disclosure may perform communication based on LTE-M technology. In this case, as an example, the LTE-M technology may be an example of the LPWAN and may be called by various names including enhanced Machine Type Communication (eMTC), and the like. For example, the LTE-M technology may be implemented as at least any one of various standards such as 1) LTE CAT 0, 2) LTE Cat M1, 3) LTE Cat M2, 4) LTE non-Bandwidth Limited (non-BL), 5) LTE-MTC, 6) LTE Machine Type Communication, and/or 7) LTE M, and is not limited to the name described above. Additionally or alternatively, the wireless communication technology implemented in the wireless devices 100a to 100f of the present disclosure may include at least one of Bluetooth, Low Power Wide Area Network (LPWAN), and ZigBee considering the low-power communication, and is not limited to the name described above. As an example, the ZigBee technology may generate personal area networks (PAN) related to small/low-power digital communication based on various standards including IEEE 802.15.4, and the like, and may be called by various names.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
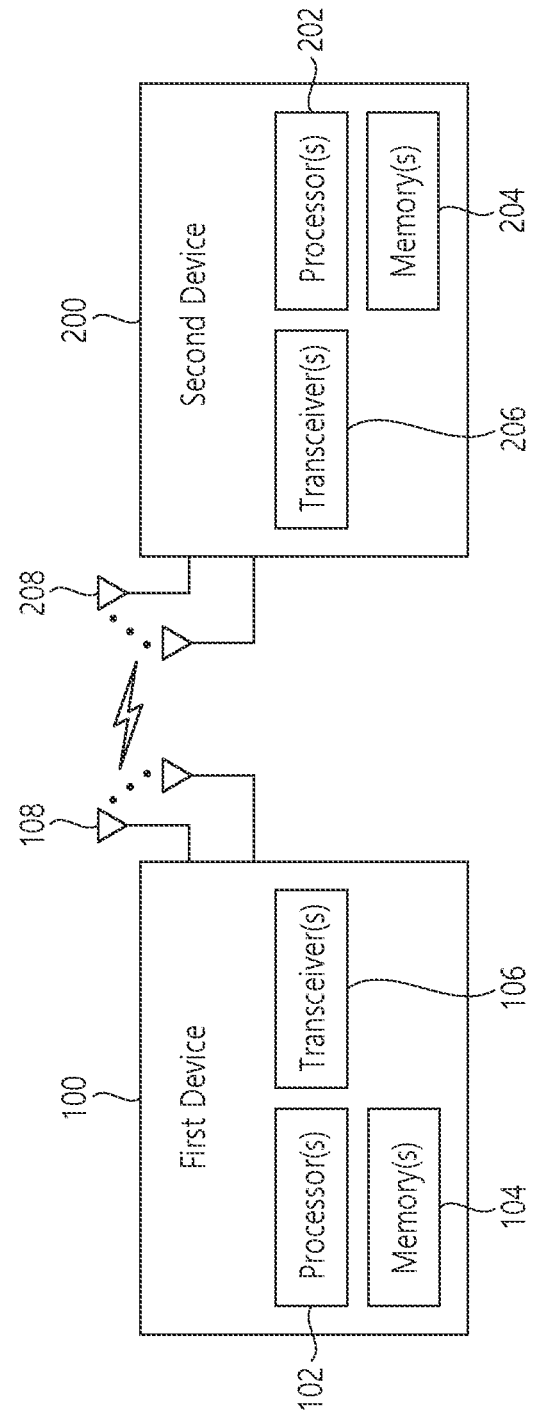
FIG. 13 shows wireless devices, based on an embodiment of the present disclosure.

FIG. 13 shows wireless devices, based on an embodiment of the present disclosure. The embodiment of FIG. 13 may be combined with various embodiments of the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and obtain the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
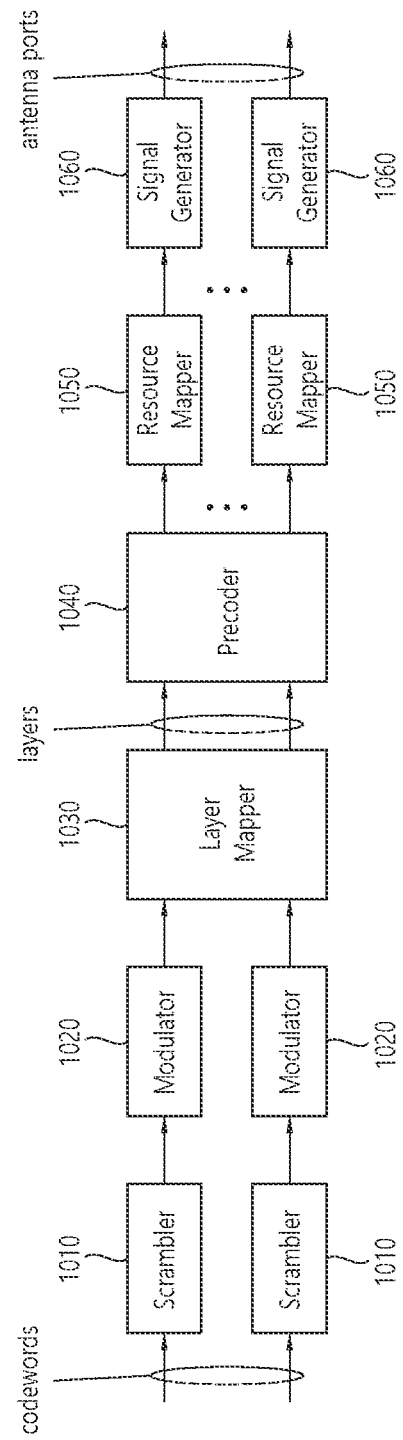
FIG. 14 shows a signal process circuit for a transmission signal, based on an embodiment of the present disclosure.

FIG. 14 shows a signal process circuit for a transmission signal, based on an embodiment of the present disclosure. The embodiment of FIG. 14 may be combined with various embodiments of the present disclosure.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 15:
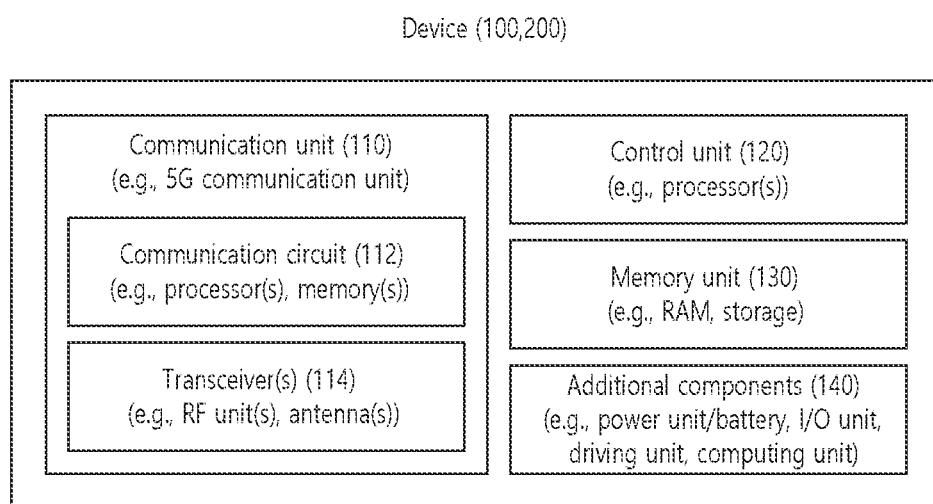
FIG. 15 shows another example of a wireless device, based on an embodiment of the present disclosure.

FIG. 15 shows another example of a wireless device, based on an embodiment of the present disclosure. The wireless device may be implemented in various forms according to a use-case/service (refer to FIG. 12). The embodiment of FIG. 15 may be combined with various embodiments of the present disclosure.

Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 12), the vehicles (100b-1 and 100b-2 of FIG. 12), the XR device (100c of FIG. 12), the hand-held device (100d of FIG. 12), the home appliance (100e of FIG. 12), the IoT device (100f of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 15 will be described in detail with reference to the drawings.

Figure 16:
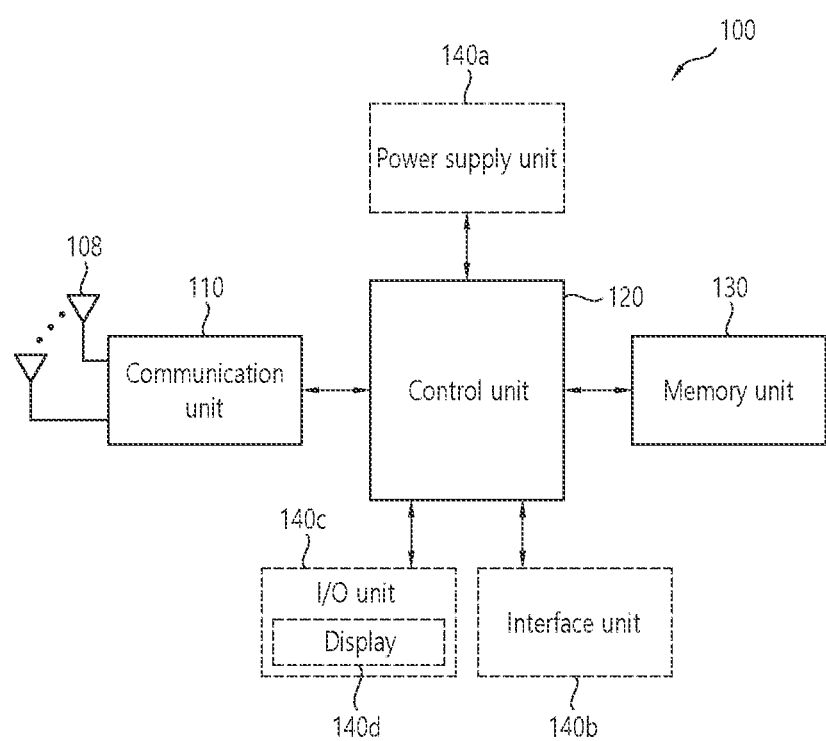
FIG. 16 shows a hand-held device, based on an embodiment of the present disclosure.

FIG. 16 shows a hand-held device, based on an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT). The embodiment of FIG. 16 may be combined with various embodiments of the present disclosure.

Referring to FIG. 16, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the obtained information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

FIG. 17 shows a vehicle or an autonomous vehicle, based on an embodiment of the present disclosure. The vehicle or autonomous vehicle may be implemented by a mobile robot, a car, a train, a manned/unmanned Aerial Vehicle (AV), a ship, etc. The embodiment of FIG. 17 may be combined with various embodiments of the present disclosure.

Referring to FIG. 17, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 15, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
- obtaining a default discontinuous reception (DRX) configuration for a groupcast or a broadcast, the default DRX configuration including information related to a sidelink (SL) DRX cycle and information related to an active time; and
- receiving, from a second device, a message for establishing a unicast connection with the second device,
- wherein the message for establishing the unicast connection with the second device is received based on the default DRX configuration.

2. The method of claim 1, wherein the default DRX configuration is received through higher layer signaling.

3. The method of claim 1, wherein the default DRX configuration is received through system information block (SIB).

4. The method of claim 1, wherein the default DRX configuration is configured based on cast type.

5. The method of claim 1, wherein the default DRX configuration is configured based on a pair of a source and a destination.

6. The method of claim 1, wherein the default DRX configuration is configured based on a service.

7. The method of claim 1, wherein the default DRX configuration is configured based on a combination of a service and a cast type.

8. The method of claim 1, wherein the default DRX configuration is configured based on a combination of a service and a destination.

9. The method of claim 1, wherein the default DRX configuration is configured based on a combination of a service and a pair of a source and a destination.

10. The method of claim 1, wherein a timing to receive the default DRX configuration is determined as a reference timing.

11. The method of claim 10, wherein the reference timing includes a start point of an SL DRX On Duration.

12. The method of claim 1, wherein information on a reference timing related to the default DRX configuration is received.

13. The method of claim 1, wherein a reference timing related to the default DRX is determined as a time point after a predefined offset value from a time point with DFN=0 based on a synchronization source.

14. A first device configured to perform wireless communication, the first device comprising:
- one or more memories storing instructions;
- one or more transceivers; and
- one or more processors connected to the one or more memories and the one or more transceivers, wherein the one or more processors execute the instructions to:
- obtain a default discontinuous reception (DRX) configuration for a groupcast or a broadcast, the default DRX configuration including information related to a sidelink (SL) DRX cycle and information related to an active time; and
- receive, from a second device, a message for establishing a unicast connection with the second device,
- wherein the message for establishing the unicast connection with the second device is received based on the default DRX configuration.

15. The first device of claim 14, wherein the default DRX configuration is received through higher layer signaling.

16. The first device of claim 14, wherein the default DRX configuration is received through system information block (SIB).

17. The first device of claim 14, wherein the default DRX configuration is configured based on cast type.

18. The first device of claim 14, wherein the default DRX configuration is configured based on a pair of a source and a destination.

19. The first device of claim 14, wherein the default DRX configuration is configured based on a combination of a service and a cast type.

20. An apparatus configured to control a first user equipment (UE), the apparatus comprising:
- one or more processors; and
- one or more memories operably connected to the one or more processors and storing instructions, wherein the one or more processors execute the instructions to:
- obtain a default discontinuous reception (DRX) configuration for a groupcast or a broadcast, the default DRX configuration including information related to a sidelink (SL) DRX cycle and information related to an active time; and
- receive, from a second device, a message for establishing a unicast connection with the second device,
- wherein the message for establishing the unicast connection with the second device is received based on the default DRX configuration.

* * * * *